US009276811B1

(12) United States Patent
Brandwine et al.

(10) Patent No.: US 9,276,811 B1
(45) Date of Patent: *Mar. 1, 2016

(54) PROVIDING VIRTUAL NETWORKING FUNCTIONALITY FOR MANAGED COMPUTER NETWORKS

(71) Applicant: Amazon Technologies, Inc., Reno, NV (US)

(72) Inventors: Eric Jason Brandwine, Haymarket, VA (US); Peter J. Hill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,794

(22) Filed: Dec. 31, 2013

Related U.S. Application Data

(63) Continuation of application No. 12/491,818, filed on Jun. 25, 2009, now Pat. No. 8,644,188.

(51) Int. Cl.
 *H04L 12/24* (2006.01)

(52) U.S. Cl.
 CPC .................................. *H04L 41/0803* (2013.01)

(58) Field of Classification Search
 None
 See application file for complete search history.

(56) References Cited

U.S. PATENT DOCUMENTS

| 6,411,967 | B1 | 6/2002 | Van Renesse | 707/201 |
| 6,529,953 | B1 | 3/2003 | Van Renesse | 709/223 |
| 6,724,770 | B1 | 4/2004 | Van Renesse | 370/432 |
| 7,068,666 | B2 | 6/2006 | Foster et al. | 370/397 |
| 7,068,667 | B2 | 6/2006 | Foster et al. | 370/398 |
| 7,124,289 | B1 | 10/2006 | Suorsa | 713/1 |
| 7,131,123 | B2 | 10/2006 | Suorsa et al. | 717/177 |
| 7,152,109 | B2 | 12/2006 | Suorsa et al. | 709/226 |
| 2004/0165600 | A1* | 8/2004 | Lee | 370/395.53 |
| 2005/0114507 | A1 | 5/2005 | Tarui et al. | 709/224 |

(Continued)

OTHER PUBLICATIONS

"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig . . . , pp. 357-382, 31 pages.

(Continued)

*Primary Examiner* — Ayaz Sheikh
*Assistant Examiner* — Tarell Hampton
(74) *Attorney, Agent, or Firm* — Seed IP Law Group PLLC

(57) ABSTRACT

Techniques are described for providing virtual networking functionality for managed computer networks. In some situations, a user may configure or otherwise specify one or more virtual local area networks ("VLANs") for a managed computer network being provided for the user, such as with each VLAN including multiple computing nodes of the managed computer network. Networking functionality corresponding to the specified VLAN(s) may then be provided in various manners, such as if the managed computer network itself is a distinct virtual computer network overlaid on one or more other computer networks, and communications between computing nodes of the managed virtual computer network are handled in accordance with the specified VLAN(s) of the managed virtual computer network by emulating functionality that would be provided by networking devices of the managed virtual computer network if they were physically present and configured to support the specified VLAN(s).

25 Claims, 11 Drawing Sheets

(56) References Cited

U.S. PATENT DOCUMENTS

| | | |
|---|---|---|
| 2005/0120160 A1 | 6/2005 | Plouffe et al. ............... 711/1 |
| 2006/0184936 A1 | 8/2006 | Abels et al. ............... 718/1 |
| 2007/0061441 A1 | 3/2007 | Landis et al. ............... 709/224 |
| 2007/0280243 A1 | 12/2007 | Wray et al. ............... 370/392 |
| 2008/0225875 A1 | 9/2008 | Wray et al. ............... 370/419 |
| 2008/0240122 A1 | 10/2008 | Richardson ............... 370/401 |
| 2009/0003353 A1 | 1/2009 | Ding et al. ............... 370/395.53 |
| 2009/0046733 A1 | 2/2009 | Bueno et al. ............... 370/409 |

OTHER PUBLICATIONS

"Cisco IP Solution Center MPLS VPN Management 4.2," Cisco Systems, Inc., retrieved Jan. 24, 2007, from http://www.cisco.com/en/US/products/sw/netmgtsw/ps5332/products_data_sheet_09186a008017d7 . . . , 5 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"MPLS-enabled VPN Services," Data Connection, retrieved Jan. 26, 2007, from http://www.dataconnection.com/solutions/vpn_vlan.htm, 1 page.

"Recent Advances Boost System Virtualization," eWeek.com, retrieved May 3, 2006, from http://www.eweek.com/article2/0,1895,1772626,00.asp, 5 pages.

"Scalable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.

Coulson, D., "Network Security Iptables," Apr. 2003, Linuxpro, Part 2, retrieved from http://davidcoulson.net/writing/lxf/39/iptables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Townsley, M., et al., "Encapsulation of MPLS over Layer 2 Tunneling Protocol Version 3: draft-ietf-mpls-over-12tpv3-03.txt," Network Working Group, Nov. 2006, retrieved Jun. 15, 2007, from http://tools.ietf.org/html/draft-ietf-mpls-over-12tpv3-03, 12 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

"Anycast," retrieved on Mar. 16, 2009, from http://en.wikipedia.org/wiki/Anycast, 4 pages.

"Load Balancing (Computing)," retrieved on Mar. 16, 2009, from http://en.wikipedia.org/wiki/Load_balancing (computing), 5 pages.

"Mobile IP," retrieved on Dec. 19, 2008, from http://en.wikipedia.org/wiki/Mobile_ip, 3 pages.

"Round Robin DNS," retrieved on Dec. 17, 2008, from http://en.wikipedia.org/wiki/Round_robin_DNS, 2 pages.

"Virtual IP Address," retrieved on Dec. 17, 2008, from http://www.answers.com/topic/virtual-ip-address-1, 2 pages.

"VMware VMotion," retrieved on Mar. 16, 2009, from http://www.vmware.com/products/vi/vc/vmotion.html. 2 pages.

"VMWare Storage VMotion," retrieved on Mar. 16, 2009, from http://www.vmware.com/products/vi/storage_vmotion.html. 2 pages.

Clark, C., et al. "Live Migration of Virtual Machines," retrieved on Mar. 16, 2009, from http://www.cl.cam.ac.uk/research/srg/netos/papers/2005-migration-nsdi-pre.pdf, 14 pages.

* cited by examiner

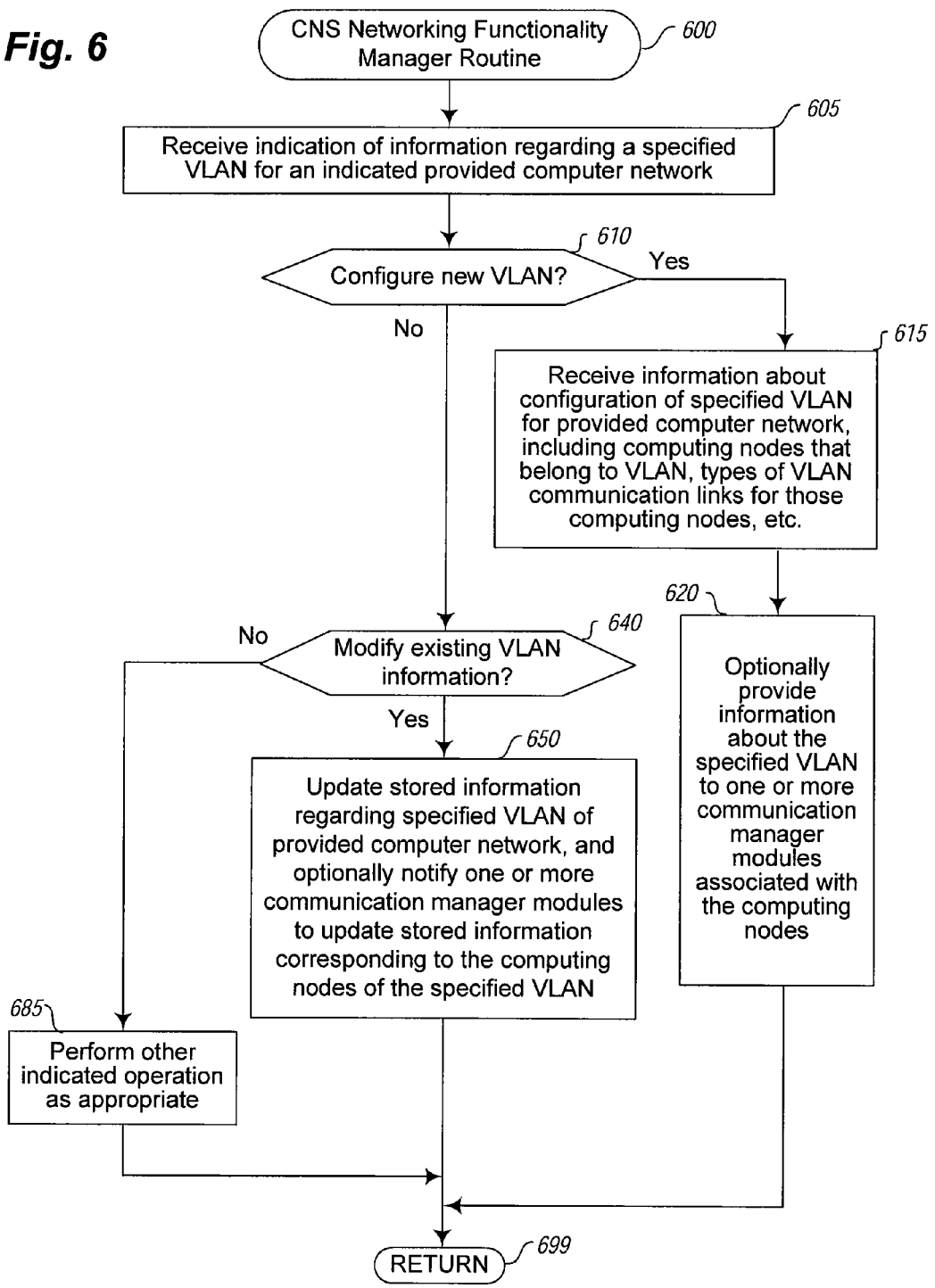

PROVIDING VIRTUAL NETWORKING FUNCTIONALITY FOR MANAGED COMPUTER NETWORKS

BACKGROUND

Many companies and other organizations operate computer networks that interconnect numerous computing systems to support their operations, with the computing systems alternatively co-located (e.g., as part of a private local area network, or "LAN") or instead located in multiple distinct geographical locations (e.g., connected via one or more other private or shared intermediate networks). For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIG. 6 illustrates a flow diagram of an example embodiment of a CNS Networking Functionality Manager routine.

DETAILED DESCRIPTION

Figure 1A:
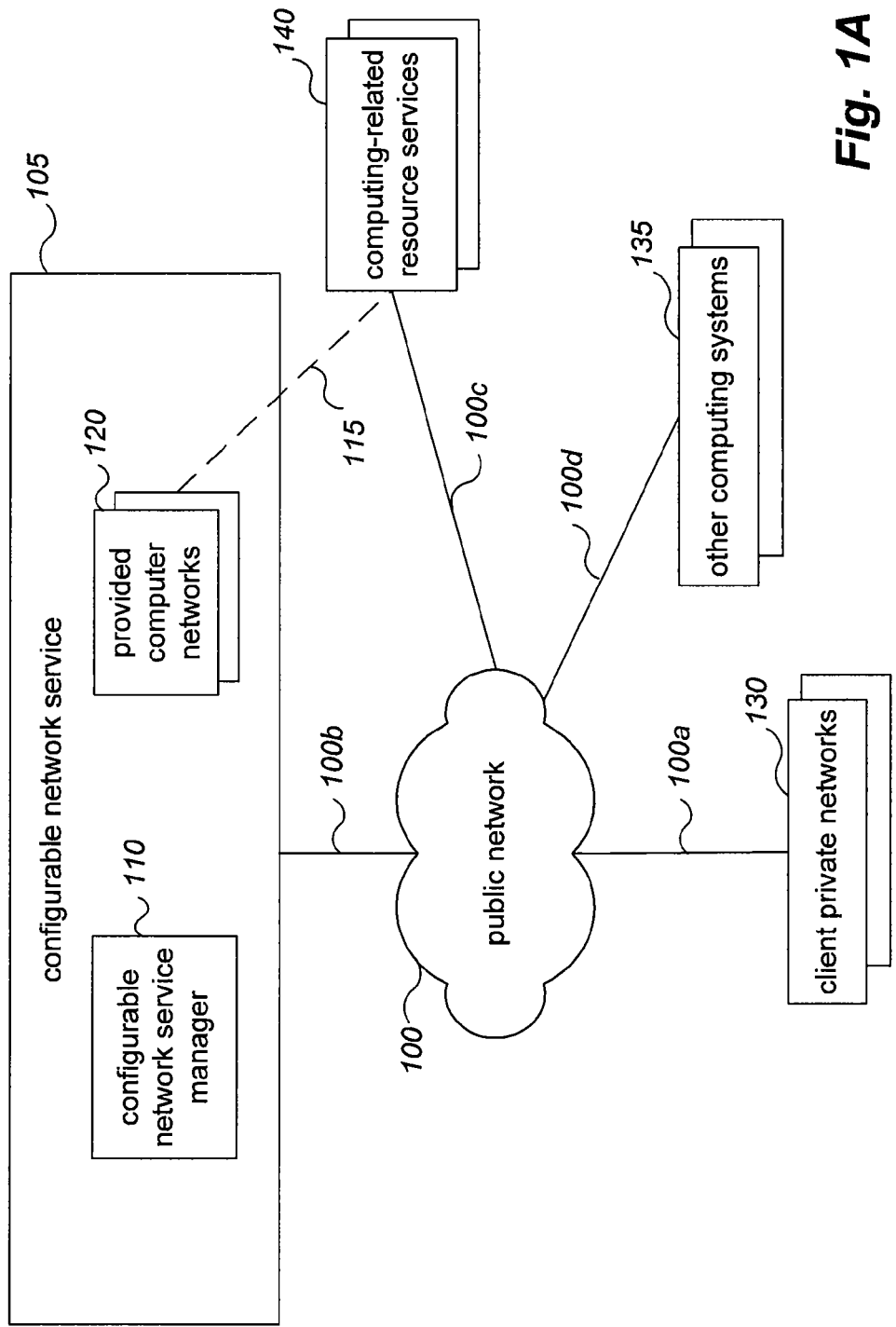
FIGS. 1A and 1B are network diagrams illustrating example embodiments of configuring and managing networking functionality provided for computing nodes belonging to a managed computer network.

Techniques are described for providing virtual networking functionality for managed computer networks, such as for computer networks that are managed and provided on behalf of users or other entities (e.g., by a network-accessible service). In at least some embodiments, the techniques enable a user to configure or otherwise specify one or more virtual local area networks for a managed computer network being provided for the user, such as with each specified virtual local area network ("VLAN") including multiple computing nodes of the managed computer network (e.g., so as to separate the managed computer network into multiple logical sub-networks or other specified groups of computing nodes). After one or more virtual local area networks are specified for a managed computer network, networking functionality corresponding to the specified virtual local area network(s) may be provided in various manners. In particular, in at least some embodiments, the managed computer network may itself be a distinct virtual computer network overlaid on one or more other computer networks, and communications between computing nodes of the managed virtual computer network are handled in accordance with the specified virtual local area network(s) of the managed virtual computer network, such as to emulate functionality that would be provided by networking devices of the managed virtual computer network if they were physically present and configured to support the specified virtual local area network(s). In at least some embodiments, some or all of the described techniques are automatically performed by embodiments of a Networking Functionality Manager ("NFM") module and/or one or more communication manager modules, such as an NFM module and multiple communication manager modules that are part of a network-accessible service that provides configurable computer networks to clients.

As noted above, in at least some embodiments, the described techniques enable a user or other entity to configure or otherwise specify one or more virtual local area networks for a managed computer network being provided on behalf of the user or entity, including in embodiments in which the managed computer network is itself a virtual computer network. Before discussing some details of providing networking functionality corresponding to specified virtual local area networks for a managed computer network, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the computing nodes being unaware of the existence and use of the intermediate physical network(s) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a user or other entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the edge of the intermediate physical network(s), by modifying the communications that enter the intermediate physical network(s) to use substrate network addresses that are based on the networking protocol of the substrate network, and by modifying the communications that leave the intermediate physical network(s) to use virtual network addresses that are based on the networking protocol of the virtual computer network. Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities), such as by providing and using numerous computing nodes that are in one or more geographical locations (e.g., in one or more data centers) and that are inter-connected via one or more intermediate physical networks. The CNS system may use various communication manager modules at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules to manage communications for the overlay virtual computer networks being provided, the CNS system may track and use various information about the computing nodes of each virtual computer network being managed, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes may include, for example, one or more of the following non-exclusive list: a quantity of the multiple computing nodes to include as part of the virtual computer network; one or more particular computing nodes to include as part of the virtual computer network; a range or other group of multiple virtual network addresses to associate with the multiple computing nodes of the virtual computer network; particular virtual network addresses to associate with particular computing nodes or particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks (e.g., virtual computer networks that are created and configured as network extensions to existing remote private computer networks of clients), although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc. In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In addition, the CNS 105 may provide functionality to enable clients to specify virtual local area networks for their managed virtual computer networks, and if so provides corresponding networking functionality (e.g., under control of an NFM module of the CNS 105, not shown), as described in greater detail later.

In the example of FIG. 1A, a number of clients interact over the public network 100 with a Manager module 110 of the CNS 105 to create and configure various managed computer networks 120 being provided by the CNS 105, such as various managed private computer network extensions 120 to remote existing client private networks 130, and with at least some such of the computer network extensions 120 being configured to enable private access from one or more corresponding client private networks 130 over the public network 100 (e.g., via VPN connections established over interconnections 100a and 100b, or via other types of private interconnections). In this example embodiment, the Manager module 110 assists in providing functionality of the CNS 105 to the remote clients, such as in conjunction with various other modules (not shown) of the CNS 105 and optionally various computing nodes and/or networking devices (not shown) that are used by the CNS 105 to provide the managed computer networks 120. In at least some embodiments, the CNS Manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices of a client. In the illustrated example, the provided computer networks 120 each include multiple computing nodes (not shown), at least some of which may be provided by or otherwise under the control of the CNS 105, and each of the provided computer network 120 may be configured in various ways by the clients for whom they are provided, such as to be an extension to a corresponding remote computer network 130. In addition, each of the provided computer networks 120 in the illustrated embodiment may be a private computer network that is accessible only by the client that creates it, although in other embodiments at least some computer networks provided by the CNS 105 for clients may be publicly accessible and/or may be standalone computer networks that are not extensions to other existing computer networks 130. Similarly, while at least some of the provided computer networks 120 in the example may be extensions to remote client computer networks 130 that are private networks, in other embodiments the provided computer networks 120 may be extensions to other client computer networks 130 that are not private networks.

Private access between a remote client private computer network 130 and corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other computing systems to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other private connection may be established to or between networks that use MPLS ("Multi Protocol Label Switching") for data transmission, such as instead of an IPsec-based VPN connection. In addition, in the illustrated example, various network-accessible remote resource services 140 are available to remote computing systems over the public network 100, including to computing nodes on the remote client private networks 130. The resource services 140 may provide various functionality to the remote computing nodes, such as for at least some of the resource services 140 to provide remote computing nodes with access to various types of computing-related resources. Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 115 that are part of the provided computer networks 120, although the actual communications with the remote resource services 140 may occur over the public networks 100 (e.g., via interconnections 100b and 100c). In addition, in at least some embodiments, a first provided computer network 120 may be configured to enable inter-access with one or more other provided computer networks 120.

The provided computer networks 120 may each be configured by clients in various manners. For example, in at least some embodiments, the CNS 105 provides multiple computing nodes that are available for use with computer networks provided to clients, such that each provided computer network 120 may include a client-configured quantity of multiple such computing nodes that are dedicated for use as part of the provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. In addition, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. Furthermore, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client.

Network addresses may be configured for a provided computer network in various manners in various embodiments. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer networks, such as based on network addresses that are available for use by the CNS 105, based on selecting network addresses that are related network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify routing information or other interconnectivity information between networking devices. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing nodes, and if so, the associated communication manager module for a computing node may take various actions to emulate desired functionality of a network.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes between which communications are managed may be physical computing systems and/or may be virtual machines that are each hosted on one or more physical computing systems, and the communications may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks. As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765-Stateless IP/ICMP Translation Algorithm", February 2000, at tools<dot>ietf<dot>org<slash>html<slash>rfc2765 (where <dot> and <slash> are replaced by the corresponding characters with those names), which is hereby incorporated by reference in its entirety. More generally, in some embodiments when implementing a first overlay network using a second substrate network, an N-bit network address that is specified for the first overlay network in accordance with a first network addressing protocol may be embedded as part of another M-bit network address that is specified for the second substrate network in accordance with a second network addressing protocol, with "N" and "M" being any integers that correspond to network addressing protocols. In addition, in at least some embodiments, an N-bit network address may be embedded in another network address using more or less than N bits of the other network address, such as if a group of N-bit network addresses of interest may be represented using a smaller number of bits (e.g., with L-bit labels or identifiers being mapped to particular N-bit network addresses and embedded in the other network addresses, where "L" is less than "N").

Various benefits may be obtained from embedding virtual network address information in substrate network addresses for an underlying physical substrate network, including enabling an overlay of the virtual computer network on the physical substrate network without encapsulating communications or configuring physical networking devices of the physical substrate network, as discussed in greater detail below. Furthermore, other information may similarly be embedded in the larger physical network address space for a communication between computing nodes in at least some embodiments and situations, such as an identifier specific to a particular virtual computer network that includes those computing nodes (e.g., a virtual computer network for a user or other entity on whose behalf those computing nodes operate), an identifier corresponding to a particular virtual local area network, etc. Additional details related to provision of such virtual computer networks via use of overlay networks are included below.

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for virtual local area networks that are specified for such a particular provided virtual computer network, with the substrate network functionality used to emulate various functionality corresponding to the specified virtual local area networks. For example, the use of the underlying substrate network may enable different computing nodes assigned to a particular virtual local area network to be located at any position within the substrate network, with the substrate network forwarding communications to destination computing nodes based on those destination computing nodes' substrate network addresses (e.g., regardless of any identifier or other information corresponding to the particular virtual local area network that is included in or with the forwarded communications, or that is otherwise associated with the forwarded communications). As such, the substrate network may support any specified virtual local area networks, without any configuration regarding such specified virtual local area networks or other use of information about such specified virtual local area networks, and with the CNS system modules (e.g., communication manager modules) instead managing the corresponding functionality for the specified virtual local area networks from the logical edges of the substrate network where the CNS system modules connect to the substrate network. In addition, modules of the CNS system may similarly operate to limit communications within the particular provided virtual computer network to occur only between computing nodes assigned to particular virtual local area networks specified for the provided computer network, such as by authorizing whether to forward particular communications to indicated destination computing nodes and by directing communications to particular computing nodes selected to act as destination computing nodes, so as to provide network isolation for computing nodes assigned to those specified virtual local area computer networks.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

Figure 1B:
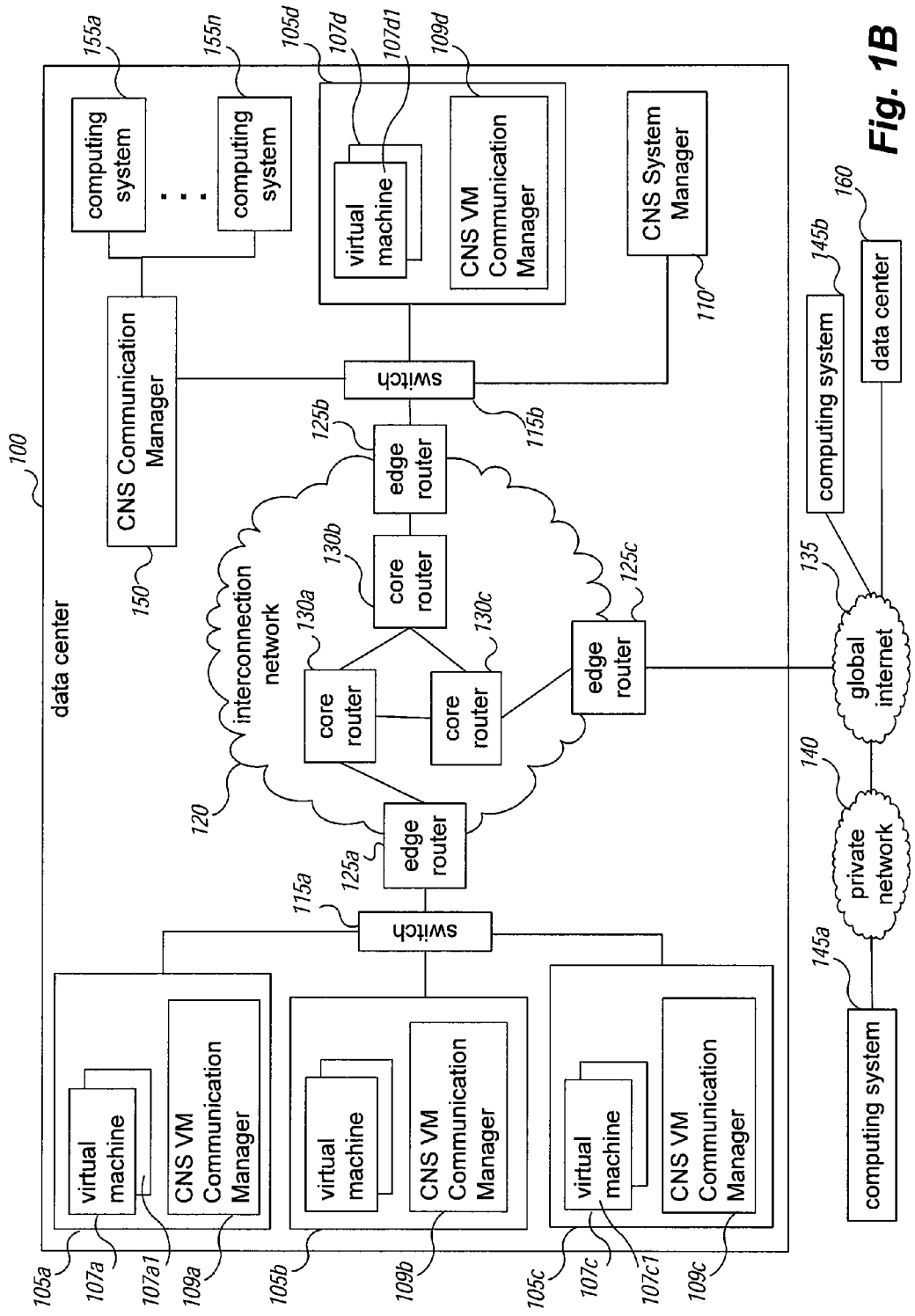

FIG. 1B is a network diagram illustrating an example embodiment of configuring and managing communications between computing nodes belonging to a virtual computer network, so that the communications are overlaid on one or more intermediate physical networks in a manner transparent to the computing nodes. In this example, the configuring and managing of the communications is facilitated by a system manager module and multiple communication manager modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 100 with multiple physical computing systems operated on behalf of the CNS system. The example data center 100 is connected to a global internet 135 external to the data center 100, which provides access to one or more computing systems 145a via private network 140, to one or more other globally accessible data centers 160 that each have multiple computing systems (not shown), and to one or more other computing systems 145b. The global internet 135 may be, for example, a publicly accessible network of networks (possibly operated by various distinct parties), such as the Internet, and the private network 140 may be, for example, a corporate network that is wholly or partially inaccessible from computing systems external to the private network 140. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems (not shown) to manage communications for the associated computing systems 155a-155n, and a System Manager module 110 that executes on one or more computing systems (not shown). In this example, each physical computing system 105a-105d hosts multiple virtual machine computing nodes and includes an associated virtual machine ("VM") communication manager module (e.g., as part of a virtual machine hypervisor monitor for the physical computing system), such as VM Communication Manager module 109a and virtual machines 107a on host computing system 105a, and such as VM Communication Manager module 109d and virtual machines 107d on host computing system 105d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may have various forms, such as, for example, a proxy computing device, firewall device, or networking device (e.g., a switch, router, hub, etc.) through which communications to and from the physical computing systems travel. In other embodiments, all or none of the physical computing systems at the data center may host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-

130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The illustrated System Manager module and Communication Manager modules may perform at least some of the described techniques in order to configure, authorize and otherwise manage communications sent to and from associated computing nodes, including to support providing various logical networking functionality for one or more virtual computer networks that are provided using various of the computing nodes, and/or to support providing various emulated or otherwise logical networking functionality corresponding to one or more specified virtual local area networks that are configured for one or more such provided virtual computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the interconnection network 120, and so as to support one or more specified virtual local area networks for such an overlaid particular virtual network. Furthermore, a particular virtual network may optionally be extended beyond the data center 100 in some embodiments, such as if one or more other data centers 160 also provide computing nodes that are available for use by the example CNS system, and the particular virtual network (and optionally one or more specified virtual local area networks) includes computing nodes at two or more such data centers at two or more distinct geographical locations. Multiple such data centers or other geographical locations of one or more computing nodes may be inter-connected in various manners, including the following: directly via one or more public networks; via a private connection, not shown (e.g., a dedicated physical connection that is not shared with any third parties, a VPN or other mechanism that provides the private connection over a public network, etc.); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 100 in other manners in other embodiments, such as if one or more other Communication Manager modules at the data center 100 are placed between edge router 125c and the global internet 135, or instead based on one or more other Communication Manager modules external to the data center 100 (e.g., if another Communication Manager module is made part of private network 140, so as to manage communications for computing systems 145a over the global internet 135 and private network 140; etc.). Thus, for example, if an organization operating private network 140 desires to virtually extend its private computer network 140 to one or more of the computing nodes of the data center 100 (and to optionally extend one or more virtual local area networks for the private network 140 to have at least some of the computing nodes of such a virtual local area network be located at the data center 100), it may do so by implementing one or more Communication Manager modules as part of the private network 140 (e.g., as part of the interface between the private network 140 and the global internet 135)—in this manner, computing systems 145a within the private network 140 may communicate with those data center computing nodes as if those data center computing nodes were part of the private network.

Thus, as one illustrative example, one of the virtual machine computing nodes 107a on computing system 105a (in this example, virtual machine computing node 107a1) may be part of the same provided virtual computer network as one of the virtual machine computing nodes 107d on computing system 105d (in this example, virtual machine computing node 107d1), any may further both be assigned to a specified virtual local area network for that virtual computer network that includes a subset of the computing nodes for that virtual computer network, such as with the IPv4 networking protocol being used to represent the virtual network addresses for the virtual local network. The virtual machine 107a1 may then direct an outgoing communication (not shown) to the destination virtual machine computing node 107d1, such as by specifying a virtual network address for that destination virtual machine computing node (e.g., a virtual network address that is unique for the local broadcast domain of the specified virtual local area network), and optionally including a VLAN identifier for the specified virtual local area network in the communication (e.g., as part of the communication header). The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual networks and/or entities with which the computing nodes are associated, information about any specified virtual local area networks to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). Such a destination virtual network address may further in some embodiments be assigned to different computing nodes of the provided virtual computer network, such as if two or more specified virtual local area networks for the provided computer network each use the same virtual network address to refer to distinct computing nodes of those specified virtual local area networks.

The Communication Manager module 109a then re-headers or otherwise modifies the outgoing communication so that it is directed to Communication Manager module 109d using an actual substrate network address, such as if Communication Manager module 109d is associated with a range of multiple such actual substrate network addresses. FIGS. 2A-2D provide examples of doing such communication management in some embodiments, including to emulate logical networking functionality corresponding to one or more virtual local area networks specified for the virtual network.

When Communication Manager module 109d receives the communication via the interconnection network 120 in this example, it obtains the virtual destination network address for the communication (e.g., by extracting the virtual destination network address from the communication), and determines to which of the virtual machine computing nodes 107d managed by the Communication Manager module 109d that the communication is directed, such as based in part on any information about a corresponding virtual local area network that is included in or otherwise associated with the communication, that is associated with the sending computing node, that is associated with the various virtual machine computing nodes 107d managed by the module 109d, etc. The Communication Manager module 109d next determines whether the communication is authorized for the destination virtual machine computing node 107d1, with examples of such authorization activities discussed in further detail in the examples of FIGS. 2A-2D. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual computer network and any specified virtual local area network, such as by using the sending virtual machine computing node 107a1's virtual network address as the source network address and by using the destination virtual machine computing node 107d1's virtual network address as the destination network address. The Communication Manager module 109d may further optionally modify the communication to add and/or remove a VLAN identifier or other information corresponding to a specified virtual local area network to which the sending and destination computing nodes belong, or may optionally not perform such a further modification (e.g., based on configuration information corresponding to the sending computing node and/or destination computing node with respect to configured VLAN communication link types specified for those computing nodes), as discussed in greater detail with respect to FIG. 2C and elsewhere. The Communication Manager module 109d then forwards the modified communication to the destination virtual machine computing node 107d1. In at least some embodiments, before forwarding the incoming communication to the destination virtual machine, the Communication Manager module 109d may also perform additional steps related to security, as discussed in greater detail elsewhere.

In addition, while not illustrated in FIG. 1B, in some embodiments the various Communication Manager modules may take further actions to provide logical networking functionality corresponding to a specified network topology for the provided virtual computer network and/or to one or more specified virtual local area networks for the provided virtual computer network, such as by managing communications between computing nodes of the provided virtual computer network in specified manners and by responding to other types of requests sent by computing nodes of the virtual computer network. For example, although being separated from computing node 107a1 on physical computing system 105a by the interconnection network 120 in the example embodiment of FIG. 1B, virtual machine computing node 107d1 on physical computing system 105d may be configured to be part of the same specified virtual local area network and/or may be configured to be part of the same logical sub-network of the virtual computer network as computing node 107a1 (e.g., to not be separated by any logical specified router devices). Conversely, despite the physical proximity of virtual machine computing node 107c1 on physical computing system 105c to virtual machine computing node 107a1 on physical computing system 105a (i.e., being part of the same physical sub-network without any intervening physical router devices) in the example embodiment of FIG. 1B, computing node 107c1 may be configured to be part of a distinct specified virtual local area network of the same provided virtual computer network from that of computing node 107a1 and/or may be configured to be part of a distinct logical sub-network of the virtual computer network from that of computing node 107a1 (e.g., may be configured to be separated by one or more logical specified router devices, not shown). If computing nodes 107a1 and 107d1 are configured to be part of the same logical sub-network, the previous example of sending a communication from computing node 107a1 to computing node 107d1 may be performed in the manner previously described, without emulating the actions of any intervening logical router devices (despite the use of multiple physical router devices in the substrate interconnection network 120 for forwarding the communication), since computing nodes 107a1 and 107d1 are configured to be part of single sub-network in the specified network topology.

However, if computing node 107a1 sends an additional communication to computing node 107c1, the Communication Manager modules 109a and/or 109c on the host computing systems 105a and 105c may perform additional actions that correspond to one or more logical specified router devices configured in the specified network topology to separate the computing nodes 107a1 and 107c1. For example, the source computing node 107a1 may send the additional communication in such a manner as to initially direct it to a first of the logical specified router devices that is configured to be local to computing node 107a1 (e.g., by including a virtual hardware address in the header of the additional communication that corresponds to that first logical specified router device), with that first logical specified router device being expected to forward the additional communication on toward the destination computing node 107c1 via the specified logical network topology. If so, the source Communication Manager module 109a may detect that forwarding of the additional communication to the logical first router device (e.g., based on the virtual hardware address used in the header of the additional communication), or otherwise be aware of the configured network topology for the virtual computer network, and may take actions to emulate functionality of some or all of the logical specified router devices that are configured in the specified network topology to separate the computing nodes 107a1 and 107c1. For example, each logical router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109a may perform some or all of those actions before forwarding the additional communication to the destination Communication Manager module 109c over the substrate network (in this case, via physical switch device 115a) for provision to destination computing node 107c1. Alternatively, some or all such additional actions to provide the logical networking functionality for the sent additional communication may instead be performed by the destination Communication Manager module 109c after the additional communication is forwarded to the Communication Manager module 109c by the Communication Manager module 109a. In addition, in at least some embodiments and situations, computing node 107a1 may not be allowed to send the additional communication to destination computing node 107c1 if they are not part of the same specified virtual local area network, depending on access constraint information specified for the provided virtual computer network.

By providing logical networking functionality using the described techniques, the CNS system provides various benefits. For example, because the various Communication Manager modules manage the overlay virtual network and may emulate functionality of logical networking devices, specified networking devices and other network topology do not need to be physically implemented for virtual computer networks being provided, and thus corresponding modifications are not needed to the interconnection network 120 or switches 115a-115b to support particular configured network topologies and/or particular specified virtual local area networks. Nonetheless, if the computing nodes and software programs of a virtual computer network have been configured to expect a particular network topology for the provided virtual computer network and/or to expect one or more particular specified virtual local area networks for the provided virtual computer network, the appearance and functionality of that network topology and/or specified virtual local area network(s) may nonetheless be transparently provided for those computing nodes by the described techniques.

As previously noted, in at least some embodiments, the described techniques enable a user to configure or otherwise specify one or more VLANs for a managed computer network being provided for the user, including in embodiments in which the managed computer network is itself a virtual computer network, and the modules of a configurable network service may perform various automated operations to emulate and otherwise logically provide networking functionality corresponding to the specified VLANs. The logical providing of the networking functionality corresponding to one or more specified VLANs of one or more provided virtual computer networks may include, for example, forwarding communications between computing nodes of a particular VLAN by using a substrate network to route or otherwise perform the forwarding, but without the physical networking devices of the substrate network being configured to use any information about the VLAN and/or without the forwarded communications including any included or associated VLAN identified for the particular VLAN.

For example, in at least some embodiments, a user or other entity may interact with an embodiment of the CNS system to configure one or more specified VLANs for a managed computer network being provided by the CNS system, such as with each VLAN to be treated as a separate networking layer 2 broadcast domain within the managed computer network. The configuration information for a particular VLAN of a managed computer network that has numerous computing nodes may include various types of information, including the following non-exclusive list: a quantity of multiple of the numerous computing nodes of the managed computer network to include as part of the VLAN; particular computing nodes of the managed computer network to include as part of the VLAN (e.g., so as to have a first specified subset of the numerous computing nodes that are part of a first VLAN, and to have a second specified subset of the numerous computing nodes that are part of a second VLAN, etc.); one or more tags or labels or other identifiers associated with each specified VLAN, whether supplied by a user or automatically assigned by the CNS system, such as in accordance with one or more networking protocols associated with each specified VLAN (e.g., an 802.1q tag identifier based on the IEEE ("Institute of Electrical and Electronics Engineers") 802.1Q standard for VLANs, an identifier based on a Label Switched Path ("LSP") label of the Multi-Protocol Label Switching ("MPLS") protocol, etc.); an indication of a type of network VLAN link configuration for each of one or more of the computing nodes that are part of the VLAN, such as to be part of a VLAN access communication link that is configured to support only this single VLAN as the native VLAN for all of the one or more computing nodes that are part of that access link (e.g., as if those one or more computing nodes are configured to use a port of a logical switch on which all one or more connected computing nodes are part of the VLAN), or part of a VLAN trunk communication link that is configured to support multiple VLANs for the one or more computing nodes that are part of that trunk link without any of those supported VLANs being a native VLAN for the trunk communication link (e.g., as if those one or more computing nodes are configured to use a port of a logical switch on which multiple connected computing nodes are part of the multiple VLANs), or part of a VLAN trunk communication link that is configured to support multiple VLANs for the one or more computing nodes that are part of that trunk link but with one of those supported VLANs being a native VLAN for the trunk communication link, etc.; network access constraints for the VLAN, such as whether and how the computing nodes of the VLAN are allowed to communicate with each other and/or with other computing nodes that are not part of the VLAN (e.g., to allow computing nodes of two VLANs of a particular managed computer network to inter-communicate but to not communicate with other computing nodes of a third VLAN of that managed computer network); etc.

As indicated above, in at least some embodiments, some or all of the computing nodes assigned to a particular VLAN may each have an associated type of VLAN communication link, such as to correspond to a configured connection to a logical switch networking device. If a computing node is configured to communicate for a particular VLAN in native mode (e.g., if part of a configured VLAN access communication link for that VLAN such that only that VLAN is supported, or if part of a configured VLAN trunk communication link that supports multiple VLANs but for which the particular VLAN is the single native VLAN), the computing node may be configured to transmit communications to other computing nodes of the particular VLAN that do not have an associated identifier for the particular VLAN, and may be configured to expect received communications from other computing nodes of the VLAN to similarly not include such a VLAN identifier. Conversely, if a computing node is not configured to communicate for a particular VLAN in native mode (e.g., if part of a configured VLAN trunk communication link that supports multiple VLANs but for which the particular VLAN is not the single native VLAN), the computing node may be configured to transmit communications that do have the associated identifier for the particular VLAN (e.g., when such communications are directed to other computing nodes of the particular VLAN), and may be configured to expect received communications from other computing nodes of the VLAN to similarly include such a VLAN identifier.

In addition, in at least some embodiments, a particular computing node of a managed computer network for a client may be configured to be part of multiple specified VLANs for the managed computer network, such as with each configured VLAN interface including a distinct virtual network address, network access constraint controls, associated VLAN communication link type, etc. Such computing nodes with multiple VLAN connection interfaces may serve various purposes, such as, for example, to serve as a client-controlled gateway between multiple VLANs (e.g., to provide capabilities such as a firewall, packet filtering, etc.), to separate managed computer network computing nodes of a first VLAN that is externally accessible from outside the managed computer network from other managed computer network computing nodes of a second VLAN that is not externally accessible, etc.

As previously noted, in at least some embodiments, the interconnections and intercommunications between computing nodes of a managed computer network provided by an embodiment of the CNS system are handled using an underlying substrate network of the CNS system, and if so, some or all of the specified VLAN configuration information for the managed computer network may be simulated in at least some such embodiments using the underlying substrate network and corresponding modules of the CNS system. For example, each of the computing nodes provided by the CNS system may be associated with a node communication manager module of the CNS system that manages communications to and from its associated computing nodes. If so, such a communication manager module may manage communications to and/or from an associated computing node, for example, by allowing/disallow such communications in a manner consistent with any VLAN(s) specified for the computing node and any associated network access constraint information, by controlling how communications are passed between the computing node and the underlying substrate network (e.g., by determining whether to include or exclude a VLAN identifier for a communication, by routing communications over the substrate network without those communications including any VLAN information and/or without the networking devices of the substrate network being configured to be aware of or support any specified VLANs, etc.), by responding to requests from computing nodes for information (e.g., ARP, or address resolution protocol, requests) with appropriate response information, etc. Such functionality may be facilitated by the communication manager module tracking information for the associated computing node that includes, for example, a substrate network address for the computing node, a logical or actual hardware address for the computing node, any associated VLANs for the computing node, a virtual network address for each VLAN, etc. In addition, a system manager module and/or a networking functionality manager module of the CNS system may facilitate the managing of at least some such logical functionality for specified VLANs, such as by obtaining VLAN configuration information from clients, and providing information to configure VLAN computing nodes and/or associated communication manager modules accordingly. In addition, the CNS system modules may provide a variety of other types of functionality, such as to manage private connections to remote client private computer networks, configured access mechanisms for remote resource services, etc.

Thus, the CNS system may take various actions to support one or more VLANs that are specified for a particular provided virtual computer network. In particular, in at least some embodiments, the CNS system may emulate logical networking functionality that corresponds to the specified VLANs for a provided virtual computer network, but without physically implementing some or all of the actual configuration for the specified VLANs. As one example, the CNS system may use multiple communication manager modules to transparently manage communications sent by and to the computing nodes of a specified VLAN of the virtual computer network in a manner that emulates functionality that would be provided by one or more networking devices if they were physically implemented for the virtual computer network and were configured to route or otherwise forward the communications in accordance with the specified VLAN. Furthermore, the CNS system may use multiple communication manager modules to emulate responses to networking requests made by computing nodes in the manner of a local physical networking device, such as to respond to ping requests, SNMP ("Simple Network Management Protocol") queries, etc. In this manner, the CNS system may provide logical networking functionality that corresponds to a specified VLAN for a provided virtual computer network, but without the computing nodes of the virtual computer network (or the associated user or other entity) being aware that the actual computer network is not configured in the normal manner to support the specified VLAN. Furthermore, as described in greater detail below, in at least some embodiments, multiple modules of the CNS system may operate together in a distributed manner to provide functionality corresponding to a particular logical networking device, such that no single module or physical device is singly responsible for emulating a particular logical networking device.

By providing the logical networking functionality for specified VLANs of managed computer networks in the manner described, network isolation may be achieved and enforced for computing nodes of a specified VLAN of a particular managed virtual computer network, such that other computing nodes do not gain access to those communications (e.g., other computing nodes that are part of other VLANs or even other managed virtual computer networks), even if the other computing nodes are part of the same physical networks as the specified VLAN computing nodes.

Figure 2A:
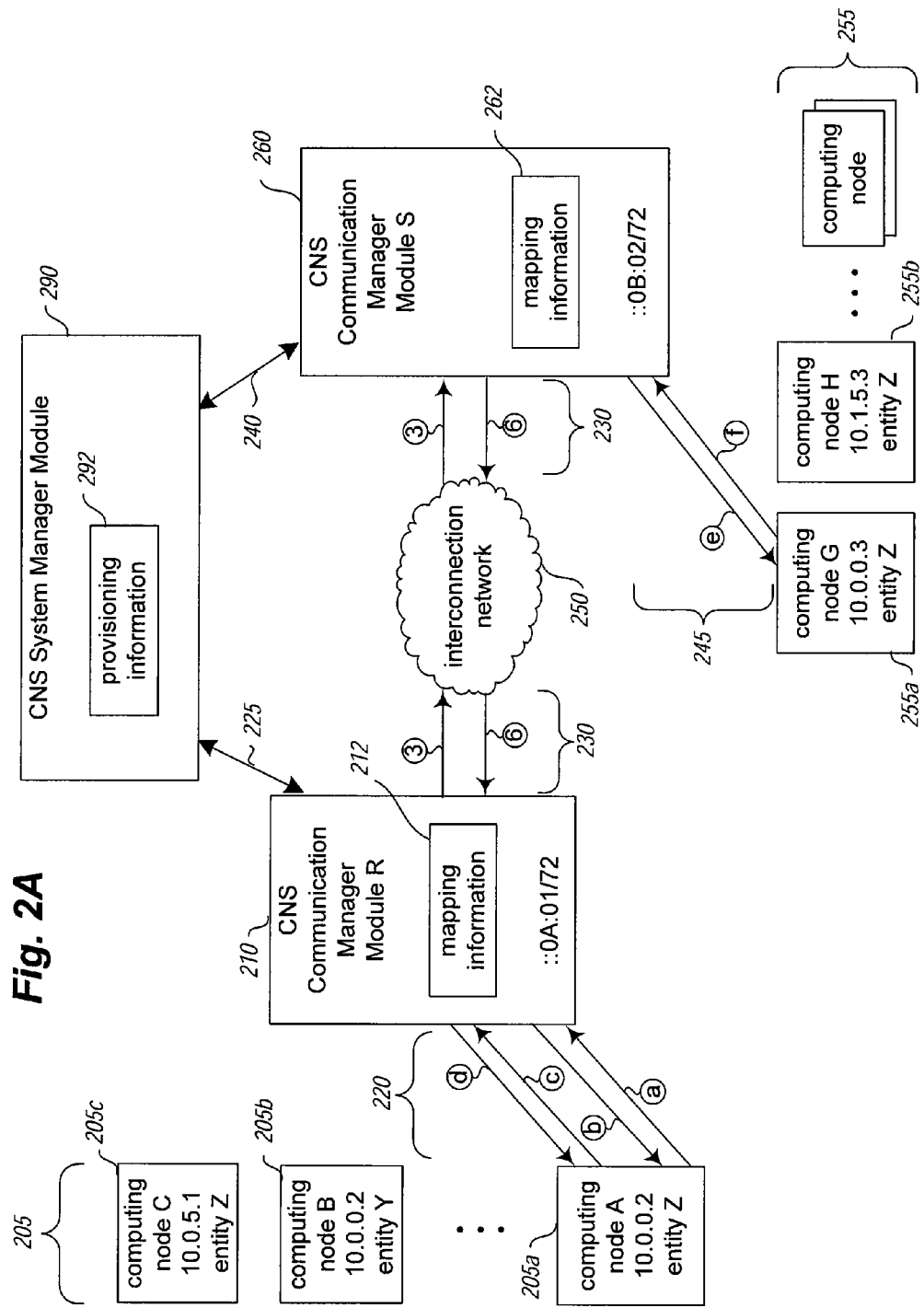
FIGS. 2A-2D illustrate examples of managing communications between computing nodes of a managed virtual overlay computer network.
Figure 2B:
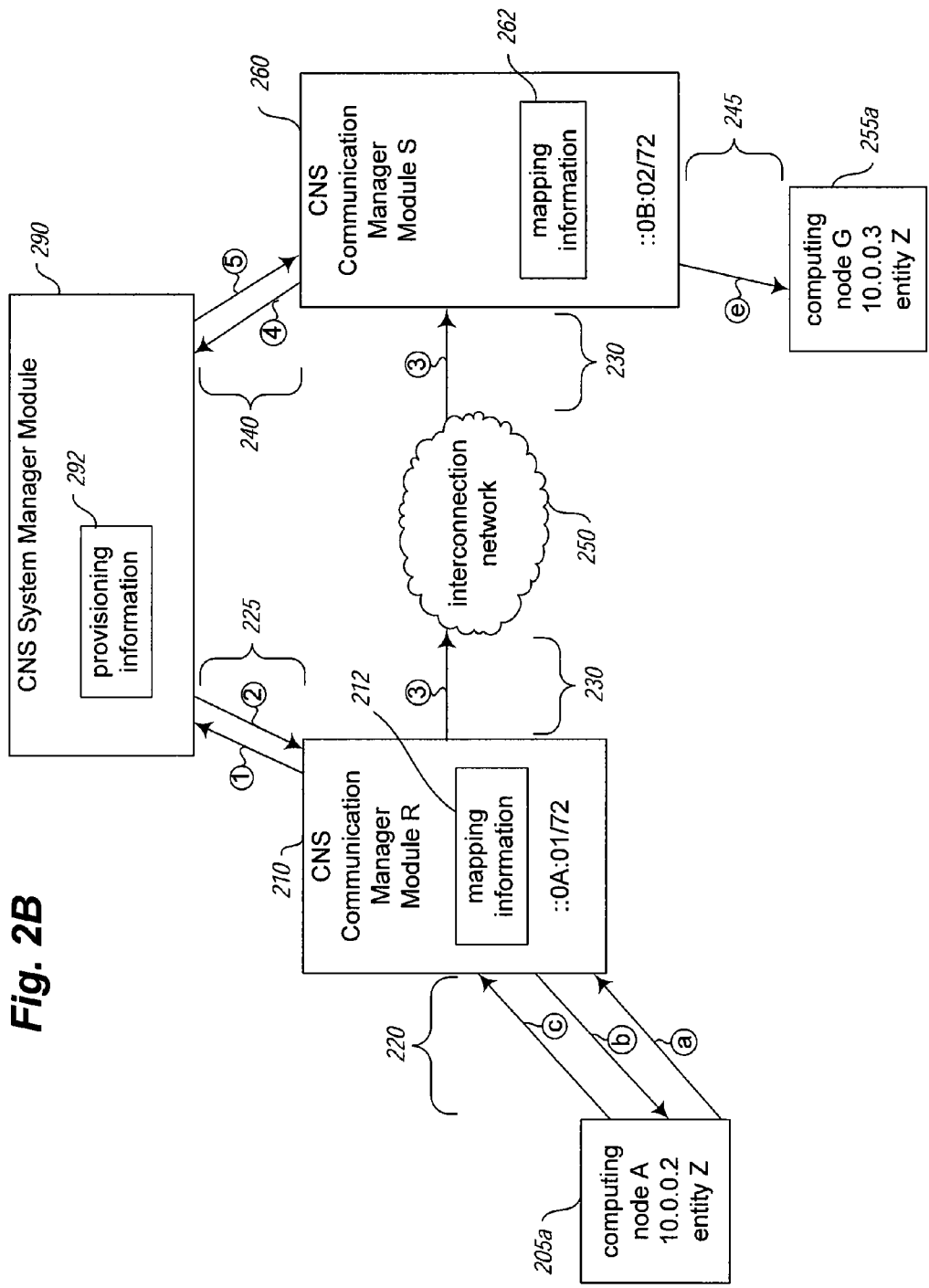
Figure 2C:
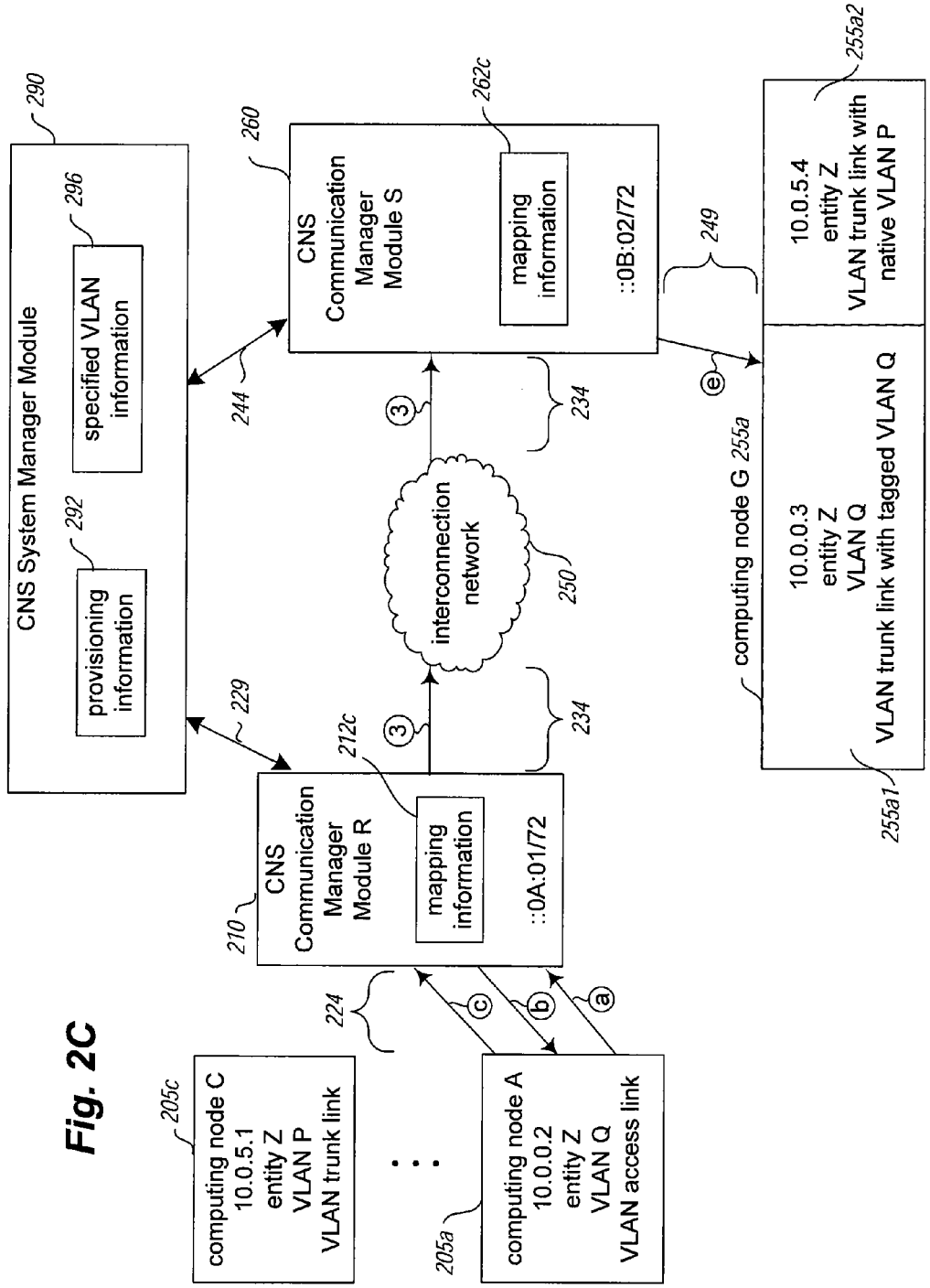
Figure 2D:
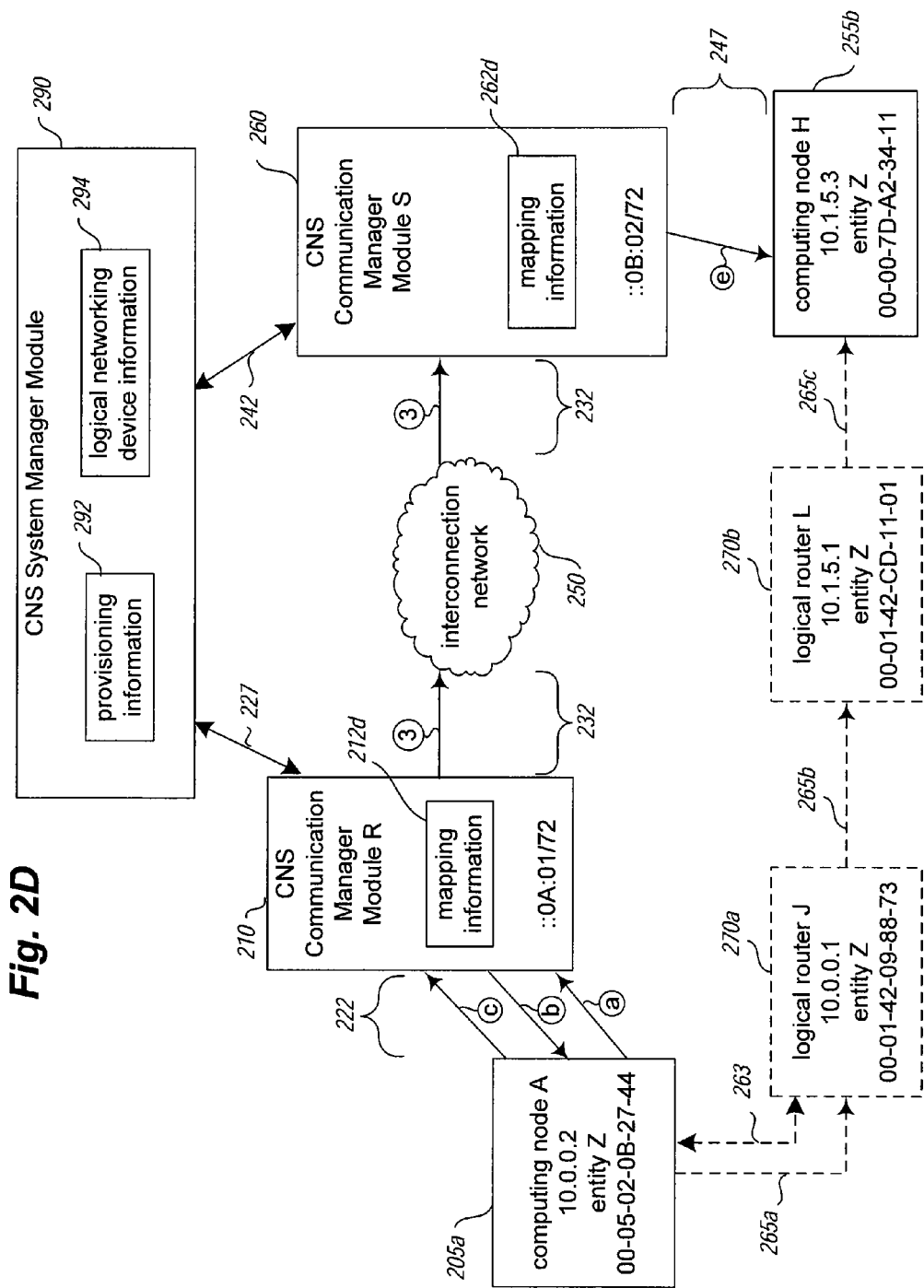

FIGS. 2A-2D illustrate further examples with additional illustrative details related to managing communications between computing nodes that occur via an overlay network over one or more physical networks, such as may be used by the computing nodes and networks of FIGS. 1A and/or 1B, or in other situations. In these examples, FIGS. 2A and 2B illustrate details regarding actions of various modules of an example CNS system in managing communications for computing nodes of a managed computer network that are not specific to a particular specified VLAN, while FIG. 2C illustrates additional details regarding similar actions in managing communications that are specific to a particular specified VLAN, and FIG. 2D illustrates additional details regarding similar actions in managing communications that are specific to a particular specified network topology.

In particular, FIG. 2A illustrates various example computing nodes 205 and 255 that may communicate with each other by using one or more intermediate interconnection networks 250 as a substrate network. In this example, the interconnection network 250 is an IPv6 substrate network on which IPv4 virtual computer networks are overlaid, although in other embodiments the interconnection network 250 and overlay virtual computer networks may use the same networking protocol (e.g., IPv4). In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes executed on behalf of an example entity Z and part of a corresponding managed virtual computer network provided for entity Z, those being computing nodes 205a, 205c, 255a and 255b. In addition, other computing nodes are operated on behalf of other entities and belong to other provided virtual computer networks, such as computing node 205b and other computing nodes 255.

In this example, the computing nodes 205 are managed by and physically connected to an associated Communication Manager module R 210, and the computing nodes 255 are managed by and physically connected to an associated Communication Manager module S 260. The CNS Communication Manager modules 210 and 260 are physically connected to an interconnection network 250, as is the System Manager module 290, although the physical interconnections between computing nodes, modules and the interconnection network are not illustrated in this example. As one example, computing nodes 205 may each be one of multiple virtual machines hosted by a single physical computing system, and Communication Manager module R may be part of a hypervisor virtual machine monitor for that physical computing system. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the interconnection network 250 would correspond to interconnection network 120 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

Each of the Communication Manager modules of FIG. 2A is associated with a group of multiple physical substrate network addresses, which the Communication Manager modules manage on behalf of their associated computing nodes. For example, Communication Manager module R is shown to be associated with the IPv6 network address range of "::0A:01/72", which corresponds to the 128-bit addresses (in hexadecimal) from XXXX:XXXX:XXXX:XXXA:0100:0000:0000:0000 to XXXX:XXXX:XXXX:XXXA: 01FF:FFFF:FFFF:FFFF (representing 2 to the power of 56 unique IPv6 addresses), where each "X" may represent any hexadecimal character that is appropriate for a particular situation. The interconnection network 250 will forward any communication with a destination network address in that range to Communication Manager module R—thus, with the initial 72 bits of the range specified, the Communication Manager module R may use the remaining available 56 bits to represent the computing nodes that it manages and to determine how to process incoming communications whose destination network addresses are in that range.

For purposes of the example shown in FIG. 2A, computing nodes 205a, 205c, 255a, and 255b are part of a single managed virtual computer network provided for entity Z, and have assigned IPv4 virtual network addresses of "10.0.0.2", "10.0.5.1", "10.0.0.3", and "10.1.5.3", respectively. Because computing node 205b is part of a distinct managed virtual computer network that is provided for entity Y, it can share the same virtual network address as computing node 205a without confusion. In this example, computing node A 205a intends to communicate with computing node G 255a, which are configured in this example to be part of a single common physical local area sub-network (not shown) in a configured network topology for the managed virtual computer network, and the interconnection network 250 and Communication Manager modules are transparent to computing nodes A and G in this example. In particular, despite the physical separation of computing nodes A and G, the Communication Manager modules 210 and 260 operate so as to overlay the managed virtual computer network for entity Z over the physical interconnection network 250 for communications between those computing nodes, including to emulate functionality corresponding to the configured local area sub-network of the managed virtual computer network, so that the lack of an actual local area network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding IPv6 actual physical substrate network addresses, with each of the virtual hardware addresses also corresponding to an IPv4 virtual network address for a particular entity's managed virtual computer network. If the local store 212 does not contain an entry for computing node G (e.g., if none of the computing nodes 205 have previously communicated with computing node G and the System Manager module 290 does not push mapping information to the Communication Manager Module R without request, if a prior entry in local store 212 for computing node G has expired based on an associated expiration time, etc.), the Communication Manager module R interacts 225 with System Manager module 290 to obtain the corresponding actual IPv6 physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual IPv6 physical substrate network address is valid, including whether computing node A is authorized to communicate with computing node G (e.g., such as based on being part of the same configured local area sub-network), and if so provides that actual IPv6 physical substrate network address.

Communication Manager module R receives the actual IPv6 physical substrate network address for computing node G from the System Manager module 290, and stores this received information as part of an entry for computing node G as part of mapping information 212 for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual IPv6 physical substrate network address as part of the mapping information entry, and provides the virtual hardware address to computing node A as part of response message 220-b. By maintaining such mapping information 212, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, the returned IPv6 actual physical substrate network address corresponding to computing node G in interactions 225 is "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). The initial 72 bits of the IPv6 network address store the "::0B:02" designation, corresponding to the sub-network or other portion of the physical interconnection network with a network address range of "::0B:02/72" to which Communication Manager module S corresponds—thus, a communication sent over the interconnection network 250 to IPv6 destination network address "::0B:02:<Z-identifier>:10.0.0.3" will be routed to Communication Manager module S. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In other embodiments, some or all such information may instead be stored and/or transmitted with a communication to computing node G in other manners, such as by including the information in a header of the communication, including in situations in which the substrate network uses the IPv4 networking protocol.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-c to any intermediate logical router devices that are configured in a network topology for the managed virtual computer network to separate the computing nodes.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the IPv6 actual physical substrate network address corresponding to that virtual destination hardware address from mapping information 212. As previously noted, the IPv6 actual physical substrate network address in this example is "::06:02:<Z-identifier>:10.0.0.3", and Communication Manager module R creates a new IPv6 header that includes that actual physical substrate network address as the destination address. Similarly, the Communication Manager module R extracts the virtual source network address and virtual source hardware address for computing node A from the header of the received communication, obtains an IPv6 actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new IPv6 header. In this example, the IPv6 actual physical substrate network address for computing node A is "::0A:01:<Z-identifier>:10.0.0.2", which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new IPv6 header (e.g., in accordance with SIIT), including populating the new IPv6 header with other information as appropriate for the communication (e.g., payload length, traffic class packet priority, etc.). Thus, the communication 230-3 includes the same content or payload as communication 220-c, without encapsulating the communication 220-c within the communication 230-3. Furthermore, access to the specific information within the payload is not needed for such re-headering, such as to allow Communication Manager module R to handle communications in which the payload is encrypted without needing to decrypt that payload. Furthermore, even if the communication includes a VLAN identifier, such as further described with respect to FIG. 2C, the interconnection network 250 will not use, or in some cases even be aware of, such VLAN information.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network and/or specified VLAN, are associated with the same entity, or are otherwise authorized to inter-communicate; based on an interaction with System Manager module 290 to obtain an authorization determination for the communication; etc.).

After Communication Manager module R forwards the modified communication 230-3 to the interconnection network 250, the interconnection network uses the physical IPv6 destination network address of the communication to route the communication to Communication Manager module S. In doing so, the devices of the interconnection network 250 do not use the portion of the destination network address that includes the embedded entity network identifier or embedded virtual network address, nor information about any specified VLAN associated with the sending computing node A and/or with the destination computing node G, and thus do not need any special configuration to forward such a communication, nor even awareness that a managed virtual computer network is being overlaid on the physical interconnection network, optionally with one or more specified VLANs.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then forwards communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-f to create communication 230-6 by generating a new IPv6 header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header using mapping information 212. Communication Manager module R then forwards response communication 220-d to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based managed virtual computer network, without any special configuration of those computing nodes to handle the actual intervening IPv6-based substrate interconnection network, and interconnection network 250 may forward IPv6 communications without any special configuration of any physical networking devices of the interconnection network, based on the Communication Manager modules overlaying the virtual computer network over the actual physical interconnection network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling networking Layer 2 raw encapsulated communications. Similarly, for link-local broadcast and multicast communications, a special multicast group /64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier.

In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without re-headering of the additional communication to use an IPv6 header since the communication will not travel over the interconnection network. However, if computing nodes 205a and 205c are configured in a network topology for the virtual computer network to be separated by one or more logical networking devices, the Communication Manager module R may take additional actions to emulate the functionality of those logical networking devices, as discussed in greater detail with respect to FIG. 2D.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the interconnection network 250 and/or that natively use IPv6 network addressing) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual IPv6 destination network address for such a managed computing node (e.g., "::0A:01:<Z-identifier>:10.0.0.2" for managed computing node A in this example), the non-managed computing system may send communications to computing node A via interconnection network 250 using that destination network address, and Communication Manager module R would forward those communications to computing node A (e.g., after re-headering the communications in a manner similar to that previously described) if Communication Manager module R is configured to accept communications from that non-managed computing system (or from any non-managed computing system). Furthermore, Communication Manager module R may generate a dummy virtual network address to correspond to such a non-managed computing system, map it to the actual IPv6 network address for the non-managed computing system, and provide the dummy virtual network address to computing node A (e.g., as the source address for the communications forwarded to computing node A from the non-managed computing system), thus allowing computing node A to send communications to the non-managed computing system.

Similarly, in at least some embodiments and situations, at least some managed computing nodes and/or their virtual computer networks may be configured to allow communications with other devices that are not part of the virtual computer network, such as other non-managed computing systems or other types of network appliance devices that do not have an associated Communication Manager module that manages their communications. In such situations, if the managed computing nodes and/or the virtual computer network is configured to allow communications with such other non-managed devices, such a non-managed device may similarly be provided with the actual IPv6 destination network address for such a computing node (e.g., "::0A:01:<Z-identifier>:10.0.0.2" for computing node A in this example), allowing the non-managed device to send communications to computing node A via interconnection network 250 using that destination network address, with Communication Manager module R then forwarding those communications to computing node A (e.g., after re-headering the communications in a manner similar to that previously described). Furthermore, Communication Manager module R may similarly manage outgoing communications from computing node A to such a non-managed device to allow computing node A to send such communications.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses and/or substrate physical network addresses to particular computing nodes of the virtual network. In such embodiments, the communication manager module obtains such configuration information from the virtual network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

In addition, in some embodiments and situations, a managed computing node may itself be treated as a phantom router, with multiple virtual network addresses associated with that managed computing node, and with that managed computing node forwarding communications to other computing nodes that correspond to those multiple virtual network addresses. In such embodiments, the communication manager module that manages communications for that managed router computing node handles communications to and from that computing node in a manner similar to that previously described. However, the communication manager module is configured with the multiple virtual network addresses that correspond to the managed router computing node, so that incoming communications to any of those multiple virtual network addresses are forwarded to the managed router computing node, and so that outgoing communications from the managed router computing node are given a substrate source physical network address that corresponds to the particular computing node that sent the communication via the managed router computing node. In this manner, routers or other networking devices of a particular customer or other entity may be virtually represented for a virtual computer network implemented for that entity.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on computing nodes A and G belonging to the same specified VLAN or to multiple VLANs that are allowed to intercommunicate, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts the actual IPv6 destination network address and actual IPv6 source network address from the header of communication 230-3, and then retrieves the embedded entity network identifiers and virtual network addresses from each of the extracted IPv6 network addresses. The Communication Manager module S next exchanges messages 240 with System Manager module 290 to obtain the corresponding actual IPv6 physical network address for the sending computing node A on behalf of computing node G, including a message 240-4 that includes the extracted virtual network addresses for computing nodes A and G and the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A, which in this example is "::0A:01:<Z-identifier>:10.0.0.2". As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical network address in response message 240-5 matches the source IPv6 network address extracted from the header of communication 230-3, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIG. 2C illustrates a further example of managing ongoing communications for the virtual computer network described with respect to FIGS. 2A and 2B, but with communications being managed to support logical networking functionality for the managed virtual computer network in accordance with a configured VLAN for the virtual computer network. In particular, FIG. 2C illustrates computing nodes A and G, Communication Manager modules R and S, System Manager module 290, and interconnection network 250 in a manner similar to that shown in FIGS. 2A and 2B. However, FIG. 2C further illustrates additional information regarding computing node A 205*a* and computing node G 255*a* as compared to FIG. 2A that corresponds to the specified VLAN (referred to as "VLAN Q" in this example), as described below, and the System Manager module 290 maintains and uses additional information 296 regarding the specified VLANs for the various managed computer networks. Furthermore, while an embodiment of a Networking Functionality Manager module is not illustrated in FIG. 2C, in at least some such embodiments such a module may be present and used to facilitate the providing of logical networking functionality in accordance with a specified VLAN, such as to assist in configuring the specified VLAN and in providing corresponding VLAN information 296 to the System Manager module 290 and/or directly to the Communication Manager modules R and S.

In this example, computing nodes A and G are both part of a specified VLAN Q for the managed virtual computer network (e.g., a specified VLAN to which other computing nodes 205*c* and 255*b* of the managed virtual computer network do not belong), and computing node A is sending a communication to computing node G in a manner similar to that of FIG. 2A. For the purposes of this example, computing nodes A and G are assumed to be authorized to intercommunicate based on both belonging to VLAN Q. In the example of FIG. 2C, the additional information that is shown for computing nodes A and G includes an indication of the specified VLAN membership for those computing nodes (e.g., based on being configured to use a particular VLAN Q identifier that is specific to VLAN Q), as well as an indication of the type of VLAN communication link that each computing node is configured to use. In particular, in this example, computing node A has been configured to be part of a VLAN access communication link for VLAN Q that natively supports VLAN Q, and computing node G has been configured to have a VLAN interface 255*a*1 that is part of a VLAN trunk communication link for VLAN Q that supports multiple VLANs and is not configured to natively support VLAN Q (e.g., does not natively support any VLAN, natively supports one of the other multiple VLANs, etc.). The configured communication link types will be used as part of the sending of the communication from computing node A to computing node G in this example, and the providing of corresponding logical networking functionality for the specified VLAN, as described below. In addition, in this example, computing node G has further been configured to have a second VLAN network interface 255*a*2 that is part of a VLAN trunk communication link for distinct VLAN P that does natively support VLAN P, with the second VLAN interface including a distinct virtual network address (and optionally a distinct virtual hardware address), such that computing node G may participate in multiple VLANs via the multiple configured interfaces. For example, computing node G may be one of multiple virtual machine computing nodes hosted on a physical computing system (not shown), as described in greater detail elsewhere—in such an embodiment, the network interfaces 255a1 and 255a2 may be distinct virtual sub-interfaces that share a single physical network interface of the physical computing system.

In a manner similar to that described with respect to FIG. 2A, computing node A determines to send a communication to computing node G as part of VLAN Q, and accordingly exchanges various messages 224 with Communication Manager module R 210. In particular, in this example, computing node A first sends an ARP message request 224-*a* for virtual hardware address information for a target computing node having an indicated virtual network address (in this example, virtual network address "10.0.0.3" for computing node G), such as in a manner similar to that of FIG. 2A. Communication Manager module R intercepts the ARP request 224-*a*, and obtains a hardware address to provide to computing node A as part of spoofed ARP response message 224-*b*. The Communication Manager module R may determine the hardware address for computing node G in various manners in various embodiments. For example, as previously discussed, the Communication Manager module R may store mapping information for various hardware address information, and if so may already have stored hardware address information for computing node G. However, in this example, the mapping information 212c stored by Communication Manager module R further includes an indication of VLAN information (not shown) for particular computing nodes as appropriate, and Communication Manager module R uses VLAN information as part of identifying appropriate stored mappings.

For example, since computing node A's configured VLAN communication link is an access link that natively supports VLAN Q in this example, the received message 224-*a* may not include any indication of VLAN Q (although in some embodiments and situations such requests may include a VLAN identifier or other indication of a VLAN corresponding to the sending computing node and/or target computing node). Nonetheless, the mapping information 212c indicates that computing node A is associated with VLAN Q, and since the requested virtual network address of "10.0.0.3" is part of the same VLAN (e.g., is part of the same logical broadcast domain corresponding to a local area network), the Communication Manager module R may be configured to automatically search for a stored mapping of that virtual network address for that specified VLAN of that managed virtual computer network. By tracking and using VLAN information in this manner, other computing nodes of other managed virtual computer networks and of other specified VLANs for the current managed virtual computer network are able to use the same virtual network address as computing node G without conflict or confusion—for example, another computing node 205 associated with Communication Manager module R and/or computing node 255 associated with Communication Manager module S may use the same virtual network address as part of a different VLAN (e.g., computing nodes 205c and/or 255b of the same managed virtual computer network).

If Communication Manager module R does not already have an entry that corresponds to computing node G, the module performs one or more interactions 229 with the System Manager module 290 to obtain information from the module 290, and in particular to obtain a substrate network address corresponding to the indicated virtual network address for VLAN Q of the managed computer network. As previously noted, the System Manager module 290 maintains various information 294 related to the configured VLANs for the virtual computer networks that it provides or otherwise manages, such as particular computing nodes and corresponding types of configured VLAN communication links, and uses that information to provide requested information to Communication Manager modules. In this example, the System Manager module 290 determines substrate network address information for computing node G, and provides that information to Communication Manager module R, optionally along with an indication that the indicated virtual network address for computing node G in the request 229 corresponds to VLAN Q and/or with an indication of the type of configured VLAN communication link for computing node G and VLAN Q. The System Manager module 290 may provide information to Communication Manager modules about VLANs for computing nodes at various times and in various manners, such as to also optionally send response information to Communication Manager module R that also indicates any other VLANs to which computing node G belongs (e.g., VLAN P as part of virtual network interface 255a2), along with corresponding virtual network addresses and optionally configured VLAN communication link types. The Communication Manager module R then stores the received information as part of mapping information 212c for future use, and provides computing node A with a hardware address for computing node G that corresponds to VLAN Q and the indicated virtual network address, in a manner similar to that of FIG. 2A. It will thus be appreciated that in situations in which a computing node is part of multiple VLANs for a particular managed computer network, a particular Communication Manager module may maintain distinct hardware addresses for the computing node for the different VLANs, although in other embodiments a single computing node may have multiple distinct network interfaces to multiple distinct VLANs that all use the same hardware address for the computing node. Thus, for example, based on computing node G being further part of VLAN P for the managed computer network (e.g., along with computing node 205c), Communication Manager module R may maintain a distinct second entry that maps computing node G's virtual network address for VLAN P (i.e., "10.0.5.4") to the same or a similar substrate network address for computing node G, along with a hardware address for computing node G for VLAN P.

In the example of FIG. 2C, after receiving the response message 224-*b* from Communication Manager module R, computing node A creates and initiates the sending of a communication to computing node G, shown in FIG. 2C as communication 224-*c*. In particular, the header of communication 224-*c* includes a destination network address for destination computing node G of "10.0.0.3", a destination hardware address from the response message 224-*b*, a source network address for sending computing node A that is "10.0.0.2", and a source hardware address for sending computing node A that is an actual or dummy hardware address that was previously identified to computing node A. Since computing node A is configured to be part of a VLAN access communication link, the communication 224-*c* from computing node A does not include a VLAN identifier (or "ID") for VLAN Q. Communication 224-*c* is then intercepted and handled by Communication Manager module R in a manner similar to that described in FIG. 2A. In particular, Communication Manager module R modifies the communication as appropriate for the substrate interconnection network 250, and forwards the modified communication over the interconnection network 250 to the substrate network location of computing node G. To determine the substrate network address to be used for forwarding the modified communication over the interconnection network 250, Communication Manager module R extracts the destination network address and destination hardware address from the header of communication 224-c, identifies the destination computing node as being part of VLAN Q in the manner previously described with respect to communication 224-a, and retrieves the corresponding substrate network address from the previously stored mapping information. In other embodiments and situations, communication 224-c will instead include the VLAN Q identifier or other indication of VLAN Q, such as if computing node A is configured to be part of a VLAN communication link that does not natively support VLAN Q. As discussed in greater detail with respect to FIG. 2B, in response to the ARP request message 224-a and/or communication 224-c, the Communication Manager module R and/or the System Manager module 290 may further perform various optional authentication activities.

After Communication Manager module R determines the IPv6 actual physical substrate network address corresponding to computing node G, it creates a new IPv6 header that includes that actual physical substrate network address as the destination address, and similarly adds a source IPv6 address for computing node A to the new header. The Communication Manager module R next creates a new communication 234-3 by modifying communication 224-c so as to replace the prior IPv4 header with the new IPv6 header (e.g., in accordance with SIIT), including populating the new IPv6 header with other information as appropriate for the new communication (e.g., payload length, traffic class packet priority, etc.). However, in this example, Communication Manager module R does not need to add any information about VLAN Q to communication 234-3, since the substrate interconnection network 250 does not use such information as part of forwarding the communication to the location of the destination computing node G, although in some embodiments and situations Communication Manager module R may nonetheless add such information for later use by the destination computing node after the forwarding. After creating communication 234-3, Communication Manager module R forwards communication 234-3 over the interconnection network 250. The interconnection network then uses the physical IPv6 destination network address of the communication 234-3 to route the communication to Communication Manager module S.

When Communication Manager module S receives communication 234-3 via the interconnection network 250, it performs actions similar to those described in FIG. 2A with respect to communication 230-3, including to optionally perform interactions 244 with the System Manager module 290 to determine if the communication is authorized, to update mapping information 262c to reflect any new information about computing node A, to modify the communication to include an appropriate IPv4 header, and to provide the modified communication as communication 249-e to computing node G. In addition, since computing node G includes multiple virtual network interfaces in this example, the Communication Manager module S further determines to forward the received communication to computing node G via network interface 255a1 in this example, such as based on one or more of the destination virtual network address specified in the received communication (e.g., if the virtual network addresses for network interfaces 255a1 and 255a2 are different), an indication (if any) of a VLAN Q identifier included with the received communication, the substrate network address used to forward the received communication to Communication Manager module S (e.g., if the substrate network addresses for network interfaces 255a1 and 255a2 are different, such as if information about the destination virtual network address is embedded in the destination substrate network address), etc.

Furthermore, as noted elsewhere, Communication Manager module R and/or Communication Manager module S take further actions in this example to modify the communication from computing node A to computing node G in such a manner as to provide logical networking functionality corresponding to the configured VLAN Q for the managed virtual computer network. As previously noted, communication 224-c did not include an indication of the VLAN Q identifier in this example, since computing node A is configured to be part of a VLAN access communication link. If the network interface 255a1 for VLAN Q of computing node G was also configured to be part of a VLAN access communication link, and thus the communication 249-e forwarded to computing node G also did not include the VLAN Q identifier, then the example communication could be forwarded from computing node A to computing node G in this example embodiment without ever adding such VLAN-specific information to the communication. Such handling of the communication is to be contrasted with a situation in which the managed computer network were instead a physically implemented computer network that forwards communications based in part of such VLAN identifiers, in which a network switch device or other networking device attached to computing node A would instead have added such a VLAN Q identifier before forwarding the communication.

However, since network interface 255a1 of computing node G is configured in this example to be part of a VLAN trunk communication link that does not natively support VLAN Q, the communication 249-e forwarded to computing node G in this example does include the VLAN Q identifier. Accordingly either Communication Manager module R and/or Communication Manager module S may be configured in this example to add the VLAN Q identifier to the communication as they modify and forward it. Similarly, if computing node G were to send a response communication (or a new communication) to computing node A via network interface 255a1, the communication created by computing node G would include the VLAN Q identifier, but the communication eventually provided to computing node A would not include the VLAN Q identifier. Either Communication Manager module R and/or Communication Manager module S may be configured in that situation to remove the VLAN Q identifier from such a communication as they modify and forward it. In addition, while a communication to and/or from computing node G using the network interface 255a2 is not illustrated in this example, it will be appreciated that Communication Manager module S (and/or another remote Communication Manager module) may similarly manage such communications in accordance with the configuration information specified for the network interface 255a2.

In this manner, the CNS system may provide logical networking functionality corresponding to configured VLANs, without any special configuration of the computing nodes of the managed virtual computer network or of the physical networking devices of the intervening substrate interconnection network, based on the Communication Manager modules overlaying the virtual computer network on the actual physical interconnection network in such a manner as to emulate the configured VLANs and corresponding functionality. In addition, multiple modules of the CNS system may operate together in a distributed manner to provide such functionality, such as with modules 210, 260 and 290 operating together in the previous example to emulate functionality corresponding to configured VLAN Q.

As previously noted, configuration information that is specified for a managed virtual computer network may include various VLAN configuration information, and various computing nodes may be selected for the virtual computer network and VLAN(s) and configured in accordance with the configuration information in various manners. For example, in some embodiments, the selection of a computing node to be assigned a particular role in a configured VLAN may be based at least in part on a geographical and/or network location of the computing node, such as an absolute location, or instead a location relative to one or more other computing resources of interest (e.g., other computing nodes of the same managed virtual computer network, other computing nodes of the same configured VLAN and/or of one or more associated VLANs, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

FIG. 2D illustrates a further example of managing ongoing communications for the virtual computer network described with respect to FIGS. 2A and 2B, but with communications being managed to support logical networking functionality for the virtual computer network in accordance with a configured network topology for the virtual computer network. In particular, FIG. 2D illustrates computing node A, Communication Manager modules R and S, System Manager module 290, and interconnection network 250 in a manner similar to that shown in FIGS. 2A and 2B. However, FIG. 2D further illustrates additional information regarding computing node A 205*a* and computing node H 255*b* as compared to FIG. 2A, as well as logical representations 270*a* and 270*b* of two specified router devices that are part of the configured network topology for the managed virtual computer network but that are not actually physically implemented as part of providing the managed virtual computer network. In particular, in this example, computing node A is sending a communication to computing node H, and the actions of the physically implemented modules 210 and 260 and devices of network 250 in actually sending the communication are shown, as well as emulated actions of the logical router devices 270*a* and 270*b* in logically sending the communication.

In this example, computing nodes A and H are configured to be part of two distinct sub-networks of the virtual computer network, and the logical router devices 270*a* and 270*b* separate the computing nodes A and H in the configured network topology for the virtual computer network. For example, logical router device J 270*a* may be a local router device to computing node A (e.g., may manage a first sub-network that includes computing node A), and logical router device L 270*b* may be a local router device to computing node H (e.g., may manage a distinct second sub-network that includes computing node H). While computing nodes A and H are illustrated as being separated by two router devices in the configured network topology in this example, it will be appreciated that two such computing nodes may be separated by 0, 1 or more than 2 router devices in other situations, and that other types of networking devices may separate computing nodes in some situations.

In the example of FIG. 2D, the additional information that is shown for computing nodes A and H includes hardware addresses associated with those computing nodes for the virtual computer network, such as virtual hardware addresses that are assigned to the computing nodes by the System Manager module 290 and/or the Communication Manager modules R and S. In particular, in this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The various hardware addresses will be used as part of the sending of the communication from computing node A to computing node H, and the providing of corresponding logical networking functionality for the virtual computer network, as described below.

Thus, in a manner similar to that described with respect to FIG. 2A, computing node A determines to send a communication to computing node H, and accordingly exchanges various messages 222 with Communication Manager module R 210. In particular, in this example, computing node A first sends an ARP message request 222-*a* for virtual hardware address information. However, unlike the example of FIG. 2A in which computing nodes A and G were part of the same logical sub-network, communications from computing node A to computing node H are expected to first pass through an initial intermediate destination of local router device J before being forwarded to computing node H. Accordingly, since logical router J is the initial intermediate destination for logically remote computing node H, the ARP message request 222-*a* includes the virtual network address for logical router J (i.e., "10.0.0.1") and requests the corresponding hardware address for logical router J. In other embodiments, computing node A may instead request virtual hardware address information for computing node H directly (e.g., using the virtual network address "10.1.5.3" for computing node H), but be provided with the corresponding hardware address for logical router J.

Communication Manager module R intercepts the ARP request 222-*a*, and obtains a hardware address to provide to computing node A as part of spoofed ARP response message 222-*b*. The Communication Manager module R may determine the hardware address for logical router J, as well as that computing node H is part of a distinct logical sub-network from computing node A, in various manners in various embodiments. For example, as previously discussed, the Communication Manager module R may store various hardware address information as part of mapping information 212*d*, and if so may already have stored hardware address information for logical router J. If not, however, Communication Manager module R performs one or more interactions 227 with the System Manager module 290 to obtain information from the module 290 corresponding to the indicated virtual network address for logical router J. Rather than obtaining a substrate network address corresponding to the indicated virtual network address, as for computing node G in FIG. 2A, the System Manager module 290 indicates that the virtual network address corresponds to a logical router device of the configured network topology, and may also provide information to the Communication Manager module R that indicates the hardware address information for logical router J. In particular, the System Manager module 290 maintains various information 294 related to the configured network topology for the virtual computer networks that it provides or otherwise manages, such as information about specified networking devices, and use that information to provide requested information to Communication Manager modules. The Communication Manager module R then stores the received information as part of mapping information 212d for future use, and in this manner determines that computing node H is part of a distinct sub-network from computing node A in the configured network topology. Furthermore, Communication Manager module R provides computing node A with the hardware address "00-01-42-09-88-73" corresponding to logical router J as part of response message 222-b. While request 222-a and response message 222-b actually pass between computing node A and Communication Manager module R in the manner discussed, from the standpoint of computing node A, the communications 222-a and 222-b are part of logical interactions 263 that occur with local router device J.

After receiving the response message 222-b from Communication Manager module R, computing node A creates and initiates the sending of a communication to computing node H, shown in FIG. 2D as communication 222-c. In particular, the header of communication 222-c includes a destination network address for destination computing node H that is "10.1.5.3", a destination hardware address that is the virtual hardware address for logical router J provided to computing node A in message 222-b, a source network address for sending computing node A that is "10.0.0.2", and a source hardware address for sending computing node A that is an actual or dummy hardware address that was previously identified to computing node A. From the standpoint of computing node A, the sent communication will be handled in the manner illustrated for logical communication 265, and will be sent to local logical router J as communication 265a for forwarding based on the destination hardware address in the communication. If logical router J were physically implemented and received such a communication 265a, it would modify the header of the communication 265a and forward the modified communication 265b to logical router L, which would similarly modify the header of the communication 265b and forward the modified communication 265c to computing node H. The modifications that logical router J would perform to such a communication 265a may include decrementing a TTL network hop value in the header and changing the destination hardware address to correspond to the next destination, which in this example would be logical router L. Similarly, the modifications that logical router L would perform to such a communication 265b may include further decrementing the TTL network hop value in the header and changing the destination hardware address to correspond to the next destination, which in this example would be computing node H. In some embodiments and situations, other similar modifications may be performed by the router devices if they were physically implemented and used for the forwarding of the communication.

While communication 222-c from computing node A to computing node H is logically handled in the manner illustrated for communication 265, the communication 222-c is actually intercepted and handled by Communication Manager module R. In particular, in a manner similar to that described in FIG. 2A for communication 220-c, Communication Manager module R intercepts the communication 222-c, modifies the communication as appropriate, and forwards the modified communication over the interconnection network 250 to computing node H. To determine the substrate network address to be used for forwarding the modified communication over the interconnection network 250, Communication Manager module R extracts the destination virtual network address and destination virtual hardware address from the header of communication 222-c. However, based on the destination virtual hardware address corresponding to logical router J, Communication Manager module R determines to use the destination virtual network address to identify the destination substrate network address, in a manner different from that of FIG. 2A. Thus, the Communication Manager module R checks the mapping information 212d to determine if a substrate network address corresponding to computing node H's virtual network address has been previously determined and stored. If not, Communication Manager module R performs one or more interactions 227 with the System Manager module 290 to determine that information, in a manner similar to the interactions 225 of FIG. 2A. As discussed in greater detail with respect to FIG. 2B, in response to the ARP request message 222-a and/or communication 222-c, the Communication Manager module R and/or the System Manager module 290 may further perform various optional authentication activities.

After Communication Manager module R determines the IPv6 actual physical substrate network address corresponding to computing node H, it creates a new IPv6 header that includes that actual physical substrate network address as the destination address, and similarly adds a source IPv6 address for computing node A to the new header. In this example, the physical substrate network address corresponding to computing node H is similar to that of computing node G, and in particular is the IPv6 substrate network address "::0B:02:<Z-identifier>:10.1.5.3", where "10.1.5.3" is stored in the last 32 bits of the 128-bit IPv6 address, and where "<Z-identifier>" is a 24-bit entity network identifier for the managed virtual computer network. Thus, as with communications sent to computing node G, a communication sent over the interconnection network 250 to the substrate network address for computing node H will be routed to Communication Manager module S. The Communication Manager module R next creates a new communication 232-3 by modifying communication 222-c so as to replace the prior IPv4 header with the new IPv6 header (e.g., in accordance with SIIT), including populating the new IPv6 header with other information as appropriate for the new communication (e.g., payload length, traffic class packet priority, etc.), and forwards communication 232-3 over the interconnection network 250. The interconnection network then uses the physical IPv6 destination network address of the communication 232-3 to route the communication to Communication Manager module S. When Communication Manager module S receives communication 232-3 via the interconnection network 250, it performs actions similar to those described in FIG. 2A with respect to communication 230-3, including to optionally perform interactions 242 with the System Manager module 290 to determine if the communication is authorized, to update mapping information 262d to reflect any new information about computing node A, to modify the communication to include an appropriate IPv4 header, and to provide the modified communication as communication 247-e to computing node H.

Furthermore, as noted elsewhere, Communication Manager module R and/or Communication Manager module S take further actions in this example to modify the communication from computing node A to computing node H in such a manner as to provide logical networking functionality corresponding to the configured network topology for the virtual computer network, including to emulate functionality that would be provided by logical routers J and L if they were physically implemented for the virtual computer network. For example, as previously discussed, logical routers J and L would perform various modifications to communication 265 as it is forwarded to computing node H if those routers were physically implemented and used, including to modify TTL network hop values and to perform other header modifications. Accordingly, Communication Manager module R and/or Communication Manager module S may perform similar modifications to the communication 222-c and/or 247-e to emulate such functionality of the logical routers J and L. Thus, computing node H receives a communication 247-e that appears to be communication 265c forwarded via the specified network topology for the virtual computer network.

In this manner, the CNS system may provide logical networking functionality corresponding to the configured network topology, without any special configuration of the computing nodes of the managed virtual computer network or of the physical networking devices of the intervening substrate interconnection network, based on the Communication Manager modules overlaying the virtual computer network on the actual physical interconnection network in such a manner as to emulate the configured network topology. In addition, multiple modules of the CNS system may operate together in a distributed manner to provide functionality corresponding to a particular logical networking device, such as with modules 210, 260 and 290 operating together in the previous example to emulate functionality corresponding to each of logical router devices 270a and 270b.

As previously noted, configuration information that is specified for a virtual computer network may include various network topology information, and various computing nodes may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

Various other types of actions than those discussed with respect to FIGS. 2A-2D may be performed in other embodiments, including for types of network addressing protocols other than IPv4 and IPv6.

As previously noted, the CNS system may in at least some embodiments establish and/or maintain virtual computer networks via the operation of one or more communication manager modules at the edge of one or more intermediate physical networks, such as by configuring and otherwise managing communications for the virtual computer networks. In some situations, a communication manager module tracks or otherwise determines the virtual computer networks to which the module's associated computing nodes belong (e.g., based on entities on whose behalf the virtual computer networks operate) as part of managing the communications for the virtual computer networks. The determination by a communication manager module of a corresponding virtual computer network for a computing node may be performed in various ways in various embodiments, such as by interacting with a system manager module that provides that information, by tracking software programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network and/or a particular VLAN to which a computing node belongs, such as if the entity maintains multiple distinct managed computer networks between different groups of computing nodes and/or multiple VLANs for a particular managed computer network. In addition, in at least some embodiments, one or more system manager modules of the CNS system may facilitate configuring communications between computing nodes, such as by tracking and/or managing which computing nodes belong to which virtual computer networks (e.g., based on executing programs on behalf of a customer or other entity), and by providing information about actual physical substrate network addresses that correspond to virtual network addresses used for a particular virtual computer network (e.g., by a particular customer or other entity).

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network with the appearance of operating on a dedicated physical network.

Figure 3:
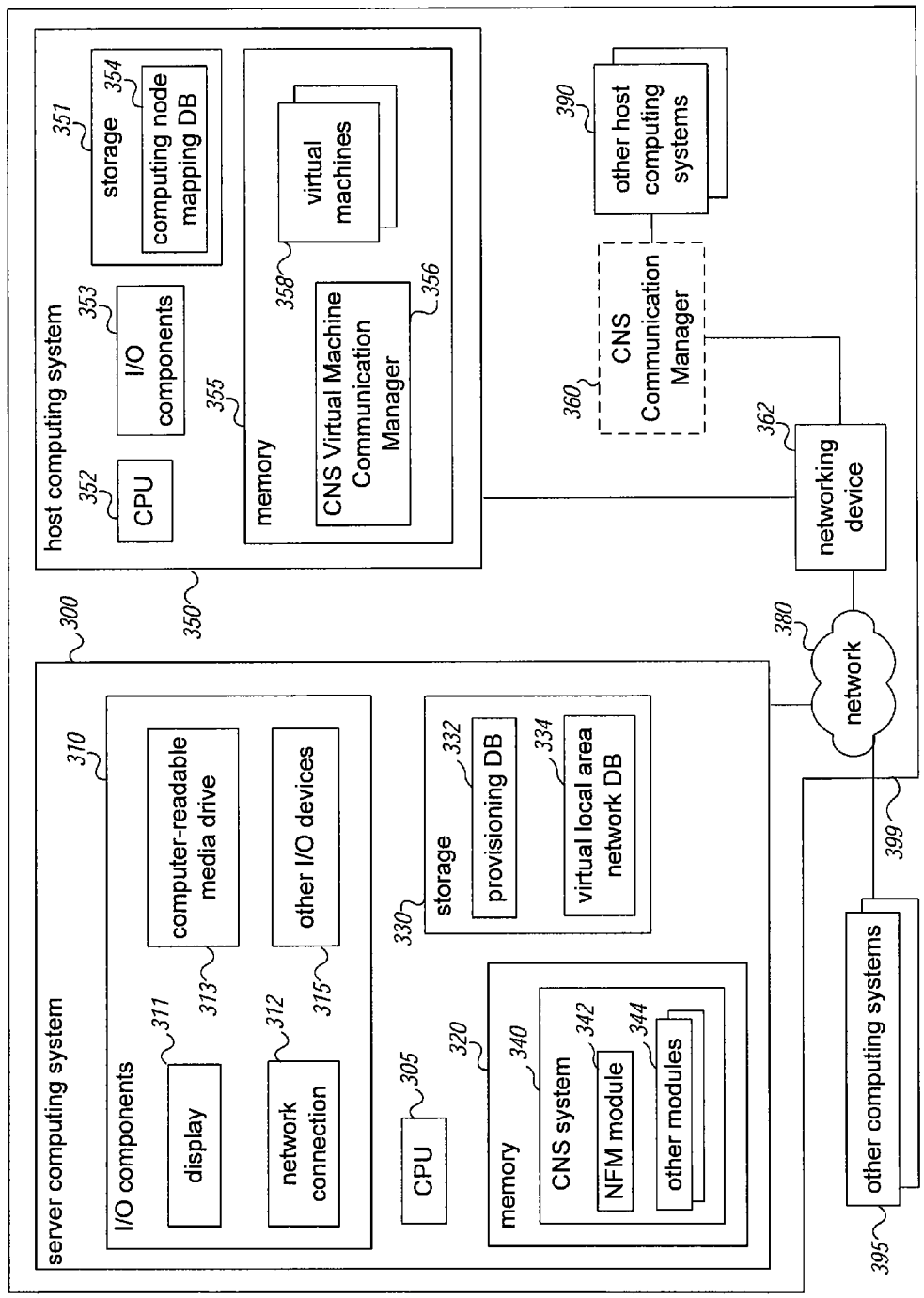
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge.

The computing system 300 operates to configure and manage virtual computer networks within the group 399, as well as to provide other functions (e.g., the provisioning, initialization, and execution of programs on computing nodes). The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358. The Communication Manager module 356 maintains various mapping information 354 on storage related to the computing nodes 358 and other computing nodes, such as in a manner similar to mapping information 212, 212c, 212d, 262, 262c and 262d of FIGS. 2A-2D. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, information about configured VLANs of various managed computer networks may be stored in the database 334 on storage 330 by the system 340, such as in a manner similar to information 296 of FIG. 2C, and provided to the Communication Manager modules at various times. In this example, the system 340 in memory 320 includes a Networking Functionality Manager ("NFM") module 342 and optionally other modules 344 (e.g., a system manager module), with the communication manager modules 356 and 360 being a further part of the distributed CNS system. The NFM module 342 performs operations to facilitate the configuration of specified VLANs for managed computer networks, such as in response to requests from clients, as discussed elsewhere.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to provide logical networking functionality corresponding to configured VLANs for provided virtual computer networks. Such interactions may, for example, enable the computing nodes 358 and/or other computing nodes to inter-communicate over managed virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and a networking functionality manager module are instead combined into a single module. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
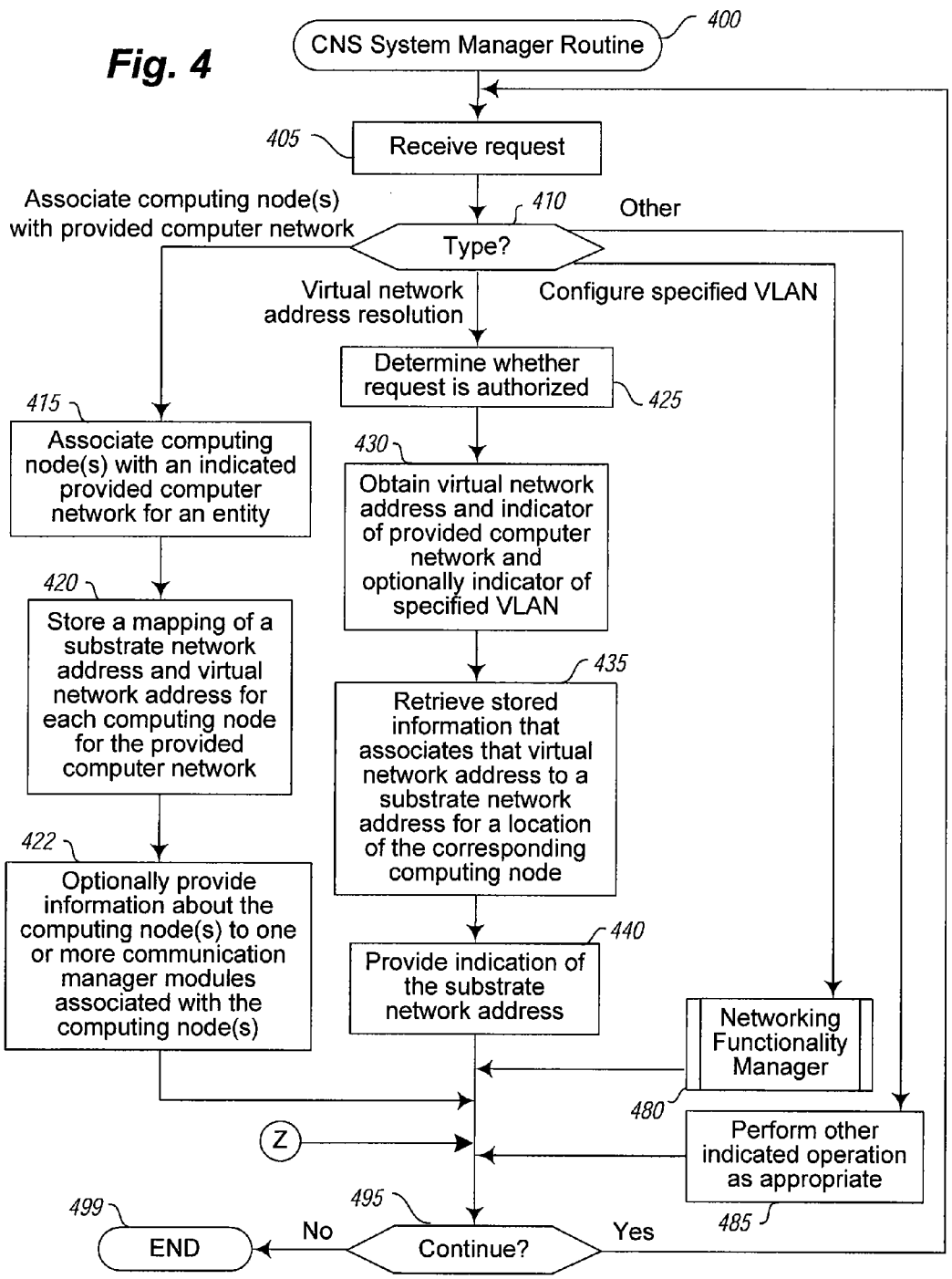
FIG. 4 illustrates a flow diagram of an example embodiment of a CNS System Manager routine.

FIG. 4 is a flowchart of an example embodiment of a CNS System Manager routine 400. The routine may be provided by, for example, execution of the system manager module 110 of FIG. 1B, the system manager module 290 of FIGS. 2A-2D, and/or a system manager module (not shown) of the CNS service 105 of FIG. 1A and/or of CNS system 340 of FIG. 3, such as to assist in managing communications between multiple computing nodes across one or more intermediate networks, including to manage communications so as to provide logical networking functionality corresponding to configured VLANs of managed computer networks, as well as to perform other types of management operations in some situations. In at least some embodiments, the routine may be provided as part of a system that manages communications for multiple different entities across a common intermediate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular managed virtual computer network provided for an indicated entity, such as if those computing nodes are executing or are to execute one or more programs on behalf of that entity, the routine continues to block 415 to associate those computing nodes with that indicated entity and virtual computer network. In some embodiments, the routine may further determine the one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store mapping information for the computing nodes and the managed virtual computer network. In particular, in the illustrated embodiment the routine stores for each computing node an indication of a physical substrate network address corresponding to the computing node, a virtual network address used by the entity for the computing node as part of the virtual computer network, optionally a virtual hardware address assigned to the computing node, and an indication of the associated entity. As discussed in greater detail elsewhere, the physical substrate network address corresponding to the computing node may in some embodiments be a substrate network address specific to that single computing node, while in other embodiments may instead refer to a sub-network or other group of multiple computing nodes, such as may be managed by an associated Communication Manager module. In addition, the specification of VLAN-related information for computing nodes is discussed in greater detail with respect to block 480 and FIG. 6, such as to be further included in the stored mapping information as discussed in greater detail previously, although in other embodiments such information could further be received and stored with respect to block 420. After block 420, the routine continues to block 422 to optionally provide information about the computing nodes and their configuration to one or more communication manager modules associated with those computing nodes, although in other embodiments instead provides such information upon request from the communication manager modules.

If it is instead determined in block 410 that the type of received request is a request for address resolution for a virtual network address of a target computing node or other network device of interest, such as from a communication manager module on behalf of a managed computing node, the routine continues instead to block 425, where it determines whether the request is authorized in one or more ways, such as based on whether the managed computing node on whose behalf the request is made is authorized to send communications to a computing node whose virtual network address resolution is requested (e.g., based on the virtual computer network(s) to which the two computing nodes belong), based on whether the managed computing node on whose behalf the request is made is a valid computing node that is currently part of a configured virtual computer network, and/or based on whether the request is received from the communication manager module that actually manages the indicated computing node on whose behalf the request is made. If the request is determined to be authorized, the routine continues to block 430, where it obtains a virtual network address of interest for a particular virtual computer network and optionally a particular VLAN, such as may be included with the request received in block 405, or previously stored and currently identifiable for the target computing node of interest based on other received information. The routine then continues to block 435 to retrieve stored information for the computing node that is associated with the virtual network address for the virtual computer network and any specified VLAN, and in particular to information that associates that virtual network address to a physical substrate network address for a network location that corresponds to the computing node, such as may be previously stored with respect to block 420, and optionally to other information for the virtual network address (e.g., an associated virtual hardware address, an indication of a type of VLAN communication link that the computing node is configured to be associated with, an indication regarding whether the virtual network address corresponds to a physically implemented computing node with an actual substrate network address or instead to a logical networking device that does not have an actual substrate network address, information about a role or status of the device corresponding to the virtual network address with respect to configured network topology information, etc.). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is to configure information regarding one or more specified VLANs for an indicated managed virtual computer network, such as from a user associated with that virtual computer network, the routine continues to block 480 to perform a Networking Functionality Manager routine to manage the configuration.

If it is instead determined in block 410 that the received request is of another type, the routine continues instead to block 485 to perform another indicated operation as appropriate. For example, in some embodiments, the routine may receive requests to update stored information about particular computing nodes, such as if a particular computing node was previously associated with a particular entity, specified VLAN and/or virtual computer network but that association ends (e.g., one or more programs being executed for that entity on that computing node are terminated, the computing node fails or otherwise becomes unavailable, an associated user or other client changes specified configuration information for the computing node, etc.). The routine may also perform a variety of other actions related to managing a system of multiple computing nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions to signal an error and/or perform other corresponding actions as appropriate.

After blocks 422, 440, 480 and 485, the routine continues to block 495 to determine whether to continue, such as until an explicit indication to terminate is received. If it is determined to continue, the routine returns to block 405, and if not continues to block 499 and ends.

Figure 5A:
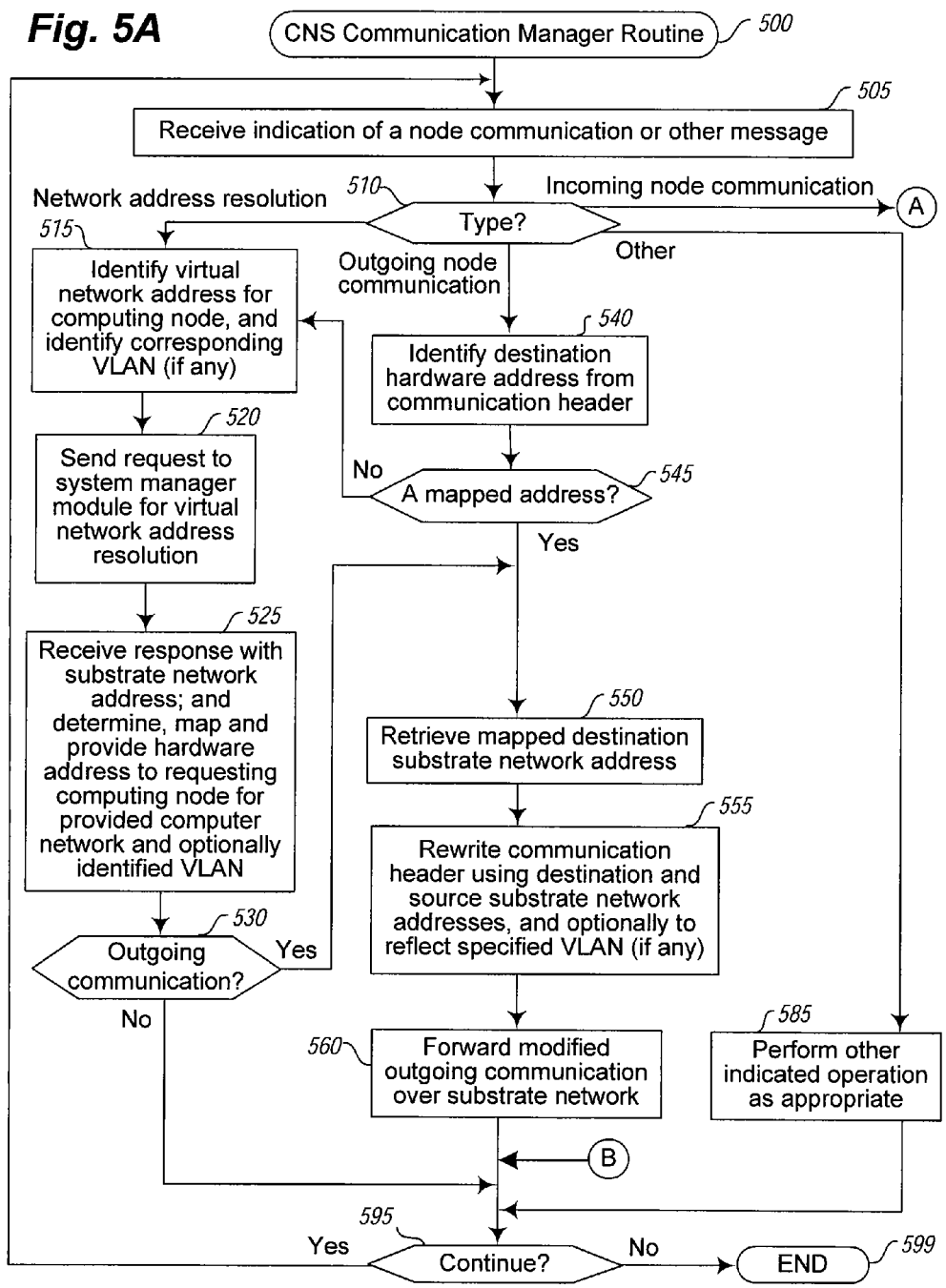
FIGS. 5A-5B illustrate a flow diagram of an example embodiment of a CNS Communication Manager routine.
Figure 5B:
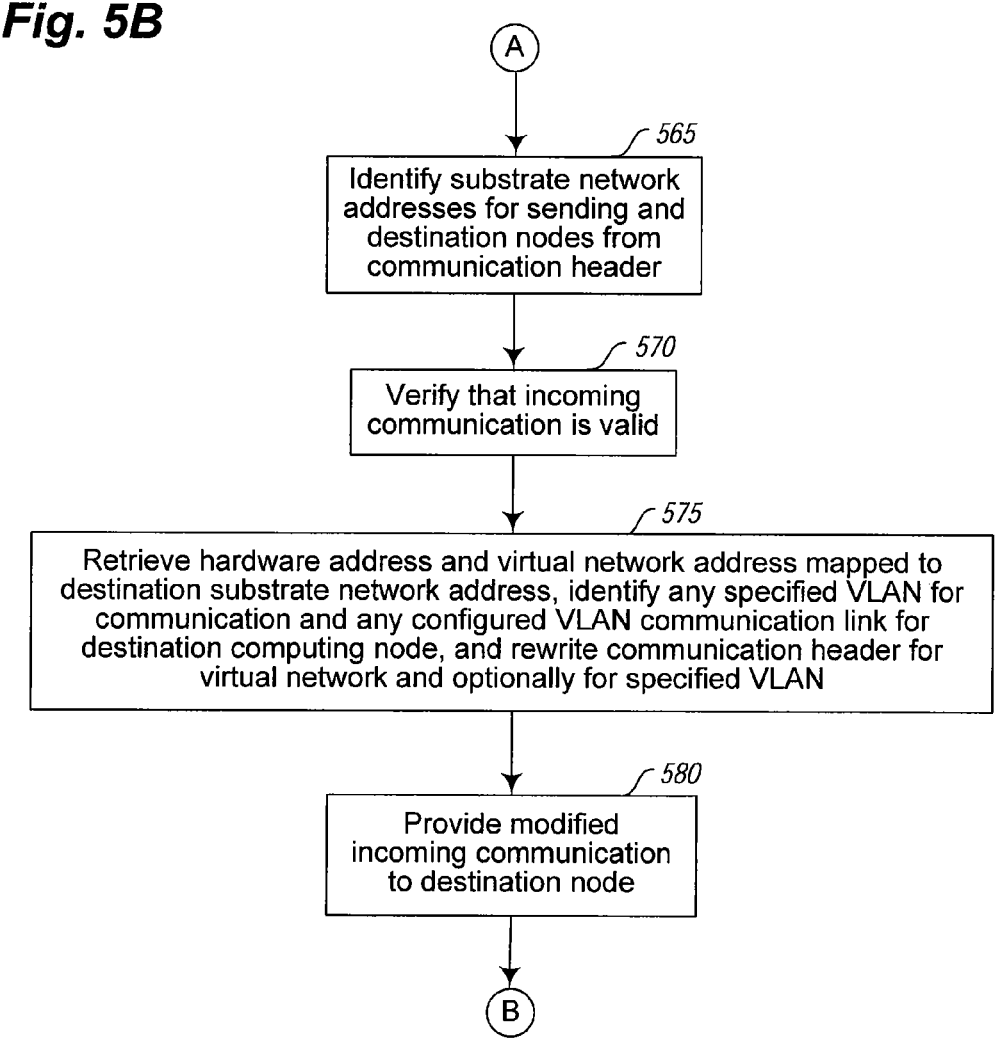

FIGS. 5A-5B are a flow diagram of an example embodiment of a CNS Communication Manager routine 500. The routine may be provided by, for example, execution of the Communication Manager modules 109a, 109b, 109c, 109d and/or 150 of FIG. 1B, the Communication Manager modules 210 and/or 260 of FIGS. 2A-2D, the Communication Manager modules 356 and/or 360 of FIG. 3, and/or a communication manager module (not shown) of the CNS service 105 of FIG. 1A, such as to manage communications to and from an associated group of one or more computing nodes in order to provide a private virtual computer network over one or more shared intermediate networks, including to determine whether to authorize communications to and/or from the managed computing nodes, and to support providing logical networking functionality corresponding to configured VLANs for managed virtual computer networks.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the virtual network address of interest indicated in the request, and to identify a specified VLAN (if any) for the virtual network address (e.g., based on a VLAN identifier included in the request, based on VLAN information associated with a sender of the request, etc.). The routine then continues to block 520 to send a request to a system manager module for virtual network address resolution for the indicated virtual network address for the identified VLAN (if any) for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, as well as configured VLAN information for virtual computer networks, while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated virtual network addresses.

In the illustrated embodiment, the routine next continues to block 525 to receive a response from the system manager module that includes a physical substrate network address and/or other information corresponding to the identified virtual network address (e.g., an indication of configured VLAN information for the virtual network address), and stores information locally that maps that physical substrate network address and/or other information to a unique hardware address for later use by the routine (e.g., based on a dummy virtual hardware address generated by the routine or provided in the response), along with other information about the computing node as discussed in greater detail elsewhere. The routine then provides the hardware address to the requesting computing node, which it may use as part of one or more later communications that it sends to the computing node with the indicated virtual network address. As discussed in greater detail elsewhere, the physical substrate network address response that is provided may in some embodiments include a physical substrate network address that is specific to the indicated computing node of interest, while in other embodiments the physical substrate network address may correspond to a sub-network or other group of multiple computing nodes to which the indicated computing node belongs, such as to correspond to another communication manager module that manages those other computing nodes. The routine then continues to block 530 to determine if blocks 515-525 were performed as part of the handling of an outgoing node communication, as discussed with respect to blocks 540-560, and if so, continues to block 550. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated remote destination computing node that is not managed by the routine, the routine continues to block 540 to identify the indicated hardware address for the destination computing node from the communication header. In block 545, the routine then determines whether that destination hardware address is a hardware address previously mapped to a physical substrate network address corresponding to the destination computing node, such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped address, the routine may cause the outgoing node communication to fail, such as with an error message back to the sending node).

If the indicated hardware address is a mapped address, or the check is not performed, the routine continues to block 550 to retrieve the physical substrate network address that is mapped to the hardware address. In block 555, the routine then rewrites the communication header in accordance with a networking address protocol for one or more intermediate networks between the sending and destination computing nodes using the physical substrate network address retrieved in block 550 or determined in block 549. The header rewriting may further include changing other information in the new header, including changing a virtual network address for the sending computing node to be a corresponding physical substrate network address, and in at least some embodiments includes modifying the received communication without encapsulation as part of an overlay of the virtual computer network over the substrate one or more intermediate physical networks. Furthermore, for a communication whose destination hardware address does correspond to a logical networking device, the routine in block 555 may further perform other modifications that correspond to providing logical networking functionality to emulate the actions and functionality that would be performed by the one or more logical networking devices that would be used to forward the communication to the destination computing node in accordance with the configured network topology for the virtual computer network. In block 560, the routine then facilitates providing of the modified outgoing communication to the destination computing node, such as by initiating forwarding of the modified outgoing communication over the substrate intermediate network (s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the type of communication or other information specific to the communication, etc.), to add and/or remove a VLAN identifier or other information about a VLAN associated with the communication (e.g., based on the type of VLAN communication links associated with the sending and destination computing nodes, such as if the communication manager module for an outgoing communication performs such a modification rather than the communication manager module for an incoming communication), etc.

If it is instead determined in block 510 that the received message is an incoming node communication for one of the managed computing nodes from an external computing node, the routine continues to block 565 to identify the physical substrate network addresses for the sending and destination computing nodes from the communication header. After block 565, the routine continues to block 570 to optionally verify that the incoming communication is valid in one or more ways. For example, the routine may determine whether the physical substrate network address for the sending computing node is actually mapped to a computing node that corresponds to the source physical substrate network address location, such as based on interactions with a system manager module and/or based on other information previously obtained and stored by the routine. In addition, the routine may determine whether the physical substrate network address for the destination computing node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node.

In the illustrated embodiment, after block 570, the routine continues to block 575 to retrieve the hardware address and the virtual network address that are mapped to the physical destination substrate network address, and to rewrite the communication header for the virtual computer network so that it appears to be sent to a computing node with that virtual network address and hardware address. For example, in some embodiments the destination virtual network address may be obtained from the destination physical substrate network address itself, such as from a subset of the bits of the destination physical substrate network address. In addition, the destination hardware address may have previously been mapped to the physical destination substrate network address, such as previously discussed with respect to block 525. In situations in which such prior mapping has not occurred, the routine may instead perform blocks 515-525 to obtain such information. The routine may similarly rewrite the communication header for the virtual computer network so that it appears to be sent from a computing node with a source virtual network address and source hardware address corresponding to the sending computing node. In addition, in at least some embodiments, the routine in block 575 may further perform other modifications to the incoming communication that correspond to providing logical networking functionality to emulate the actions and functionality that would be performed if the communication was forwarded in a manner associated with a configured VLAN for the managed virtual computer network, such as to add and/or remove a VLAN identifier or other VLAN information, although in other embodiments such a modification is not performed for an incoming communication if it was instead performed for the communication when outgoing for another communication manager module, or if no modification is needed based on the configured VLAN communication links associated with the sending and destination computing nodes. Furthermore, in at least some embodiments, the routine in block 575 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 575, the routine continues to block 580 to facilitate providing of the modified incoming communication to the destination computing node, such as by initiating forwarding of the modified incoming communication to the destination node.

If it is instead determined in block 510 that a message of another type is received, the routine continues to block 585 to perform another indicated operation as appropriate, such as to store information about entities associated with particular computing nodes, store information about configured VLANs for particular virtual computer networks, store information about configured network topologies for particular virtual computer networks, respond to requests and other messages from computing nodes in a manner to provide logical networking functionality corresponding to configured VLANs and/or network topologies for virtual computer networks (e.g., by emulating actions and other functionalities that would be performed by specified logical networking devices if they were physically implemented), update previously mapped or stored information to reflect changes with respect to computing nodes that are being managed or to remote computing nodes, etc. The storing and/or updating of stored information may be initiated in various manners, such as by receiving information in response to previous requests, receiving information that is proactively pushed to the routine without a corresponding request, etc.

After blocks 560, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

FIG. 6 is a flow diagram of an example embodiment of a CNS Networking Functionality Manager routine 600. The routine may be provided by, for example, execution of the NFM module 342 of FIG. 3, a networking functionality manager module (not shown) of the CNS service 105 of FIG. 1A, and/or a networking functionality manager module (not shown) that operates in conjunction with the System Manager module 110 of FIG. 1B or of the System Manager module 290 of FIGS. 2A-2D, such as to manage the configuration of specified VLANs for managed computer networks. In the illustrated embodiment, the routine may be invoked by, for example, execution of block 480 of FIG. 4 and/or directly in response to a request initiated by a client of the CNS system. In addition, in the illustrated embodiment of the routine, a networking functionality manager module facilitates the configuration of specified VLANs, and provides corresponding information to a system manager module that further interacts with communication manager modules based on the specified VLAN information—in other embodiments, however, various functionality may be distributed in other manners, such as to combine some or all functionality of a networking functionality manager module, a system manager module, and/or one or more communication manager modules.

The routine begins at block 605, where an indication is received of configuration information related to a specified VLAN for a managed computer network. The routine continues to block 610 to determine whether the indication is to configure a new VLAN. If so, the routine continues to block 615 to receive various information about the configured VLAN, such as information previously received in block 605, or by interacting with a user or other entity providing the configuration information. The received information may include, for example, an identifier for the VLAN, information regarding computing nodes of the managed computer network to include as part of the VLAN, types of VLAN communication links to which the computing nodes are attached, a client-specified name and/or description for the VLAN, etc. The routine then continues to block 620 to store such received information (e.g., in a manner accessible to a system manager module, such as by providing the received information to the system manager module), and optionally provides the configuration information (e.g., in a push manner) to one or more communication manager modules that are associated with computing nodes of the specified VLAN. While illustrated here as occurring all at once, in other embodiments and situations such configuration may occur in other manners, such as to incrementally specify different types of configuration information at different times (e.g., to specify types of VLAN communication links for computing nodes at a later time after the computing nodes have been specified by a user or automatically selected by the CNS system). In addition, the routine may perform a variety of actions to support such configuration of a new VLAN, such as to automatically assign a VLAN identifier to the VLAN, to automatically select some or all of the computing nodes to include in the VLAN, etc. Furthermore, in at least some embodiments, some or all previously specified types of configuration information (e.g., particular computing nodes, types of VLAN communication links of particular computing nodes, etc.) may be modified after it was configured, including dynamically during use of the specified VLAN or otherwise after the specified VLAN has been in use.

If it is instead determined in block 610 that the received indication is not to configure a new VLAN, the routine continues instead to block 640 to determine if the received indication is to modify a previously configured VLAN. If so, the routine continues to block 650 to obtain information about the modifications, such as in a manner similar to that previously described with respect to block 615, and then to update the stored information for the VLAN, such as in a manner similar to that previously described with respect to block 620.

If it is instead determined in block 640 that the received information is not an indicated modification to an existing VLAN, the routine continues to block 685 to perform one or more other indicated operations as appropriate. Such other operations may include, for example, configuring network access constraint information within a specified VLAN and/or between VLANs (e.g., to automatically enable intercommunications between computing nodes of a specified VLAN unless otherwise configured, to automatically enable or disable intercommunications between computing nodes of distinct VLANs of a managed computer network unless otherwise configured, etc.), responding to requests for information about configured VLANs (e.g., from other CNS system modules), monitoring information about use of specified VLANs, performing periodic review and repair of VLANs, etc. After blocks 620, 650, or 685, the routine continues to block 699 and returns.

In addition, various embodiments may provide mechanisms for customer users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can manage the creation or deletion of virtual computer networks, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" and in U.S. application Ser. No. 12/414,260, filed Mar. 30, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
providing, by one or more configured computing systems, networking functionality for a first virtual computer network overlaid on a substrate network, the first virtual computer network having a specified virtual local area network logically interconnecting multiple computing nodes, the providing of the networking functionality including:
tracking, by the one or more configured computing systems, an identifier specific to the specified virtual local area network;
modifying, by the one or more configured computing systems, a communication sent to a destination computing node of the multiple computing nodes from another of the multiple computing nodes, the modifying being performed before the communication is forwarded over the substrate network and including removing the identifier from the communication if the communication includes the identifier;

forwarding the modified communication over the substrate network to the destination computing node;

after the forwarding of the modified communication, further modifying, by the one or more configured computing systems, the modified communication to include the identifier; and initiating providing, by the one or more configured computing systems, the further modified communication to the destination computing node.

2. The computer-implemented method of claim 1 further comprising, before the providing of the networking functionality, receiving configuration information for the first virtual computer network that indicates multiple virtual local area networks in the first virtual computer network each having a distinct identifier, wherein the specified virtual local area network is one of the multiple virtual local area networks, and wherein the providing of the networking functionality is performed in accordance with the received configuration information.

3. The computer-implemented method of claim 2 wherein the first virtual computer network includes a plurality of computing nodes, and wherein the multiple virtual local area networks each logically interconnects a distinct subset of multiple of the plurality of computing nodes.

4. The computer-implemented method of claim 2 further comprising identifying, by the one or more configured computing systems and before the further modifying of the modified communication to include the identifier, that the communication is associated with the specified virtual local area network.

5. The computer-implemented method of claim 1 further comprising receiving, from a user, configuration information that specifies a network topology for the first virtual computer network including multiple virtual router devices, and wherein the providing of the networking functionality is performed to provide the first virtual computer network for the user in accordance with the configuration information and includes emulating functionality of the multiple virtual router devices.

6. The computer-implemented method of claim 1 wherein the destination computing node is associated with a communication link of the first virtual computer network that is configured to not be associated solely with the specified virtual local area network.

7. The computer-implemented method of claim 1 further comprising forwarding a second communication to a second computing node of the multiple computing nodes and providing the forwarded second communication to the second computing node without modifying the second communication to include any information corresponding to the specified virtual local area network, the second computing node being associated with a communication link of the first virtual computer network that is configured to be associated solely with the specified virtual local area network.

8. The computer-implemented method of claim 7 wherein the communication link with which the second computing node is associated is a virtual local area network access link that is natively associated with the specified virtual local area network, and wherein the destination computing node is configured to use a virtual local area network trunk link that is associated with multiple virtual local area networks including the specified virtual local area network.

9. The computer-implemented method of claim 1 further comprising identifying, before the further modifying of the modified communication, that the communication is associated with the specified virtual local area network based at least in part on a sending computing node that sent the communication being associated with a communication link configured to be associated solely with the specified virtual local area network.

10. The computer-implemented method of claim 9 wherein the communication link with which the sending computing node is associated is a virtual local area network access link, wherein the communication sent from the sending computing node does not include the identifier as a result of that communication link being a virtual local area network access link, wherein the modifying of the communication performed before the communication is forwarded over the substrate network further includes preventing any information corresponding to the specified virtual local area network from being added to the communication before it is forwarded over the substrate network, and wherein the destination computing node is configured to use a virtual local area network trunk link that is not associated solely with the specified virtual local area network.

11. The computer-implemented method of claim 1 wherein the identifier specific to the specified virtual local area network is an IEEE ("Institute of Electrical and Electronics Engineers") 802.1Q VLAN tag.

12. The computer-implemented method of claim 1 wherein the identifier specific to the specified virtual local area network is a Label Switched Path label associated with the Multi-Protocol Label Switching protocol.

13. The computer-implemented method of claim 1 further comprising:

forwarding, over the substrate network, a second communication sent between the multiple computing nodes, the forwarded second communication having associated information that indicates the specified virtual local area network, and the forwarding being performed to maintain the associated information but without the substrate network using the associated information or using any other information associated with the specified virtual local area network; and after the forwarding of the second communication over the substrate network, providing a copy of the forwarded second communication that includes the associated information to the destination computing node.

14. The computer-implemented method of claim 1 further comprising:

forwarding, over the substrate network, a second communication sent between the multiple computing nodes, the forwarded second communication having associated information that indicates the specified virtual local area network, and the forwarding being performed to maintain the associated information but without the substrate network using the associated information or using any other information associated with the specified virtual local area network;

after the forwarding of the second communication over the substrate network, modifying, by the one or more configured computing systems, the second communication to remove the associated information; and initiating providing, by the one or more configured computing systems, the modified second communication to a second destination computing node for the second communication.

15. The computer-implemented method of claim 1 wherein the multiple computing nodes are each a virtual machine hosted on one of multiple host physical computing systems, wherein the one or more configured computing systems include one of the multiple host physical computing systems, and wherein the method is performed by a virtual machine communication manager module that executes on the one physical computing system to manage communications by the virtual machine computing nodes hosted on the one physical computing system.

16. A non-transitory computer-readable medium having stored contents that, when executed, configure a computing system to:
provide, by the configured computing system, networking functionality for a first virtual computer network overlaid on a substrate network, the first virtual computer network having a specified virtual local area network logically interconnecting multiple computing nodes, the providing of the networking functionality including:
tracking, by the configured computing system and for each of the multiple computing nodes, an identifier of a location of the computing node in the substrate network;
modifying, by the one or more configured computing systems, a communication sent to a destination computing node of the multiple computing nodes from another of the multiple computing nodes, the modifying being performed before the communication is forwarded over the substrate network and including adding the tracked identifier for the destination computing node to the communication;
forwarding, over the substrate network based on the added tracked identifier, the modified communication to the destination computing node;
after the forwarding of the modified communication, further modifying, by the configured computing system, the modified communication to add an identifier specific to the specified virtual local area network; and
initiating providing, by the configured computing system, the further modified communication to the destination computing node.

17. The non-transitory computer-readable medium of claim 16 wherein the stored contents include instructions that, when executed, further configure the computing system to receive from a user, before the providing of the networking functionality, configuration information that specifies a network topology for the first virtual computer network including multiple router devices, and wherein the providing of the networking functionality is performed to provide the first virtual computer network for the user in accordance with the configuration information and includes emulating functionality of the multiple router devices.

18. The non-transitory computer-readable medium of claim 16 wherein the destination computing node is associated with a communication link of the first virtual computer network that is configured to be associated with multiple virtual local area networks including the specified virtual local area network, and wherein the modified communication forwarded over the substrate network does not include the identifier specific to the specified virtual local area network.

19. The non-transitory computer-readable medium of claim 16 wherein the stored contents include instructions that, when executed, further configure the computing system to forward a second communication to a second computing node of the multiple computing nodes and to provide the forwarded second communication to the second computing node without modifying the second communication to add information corresponding to the specified virtual local area network, wherein the second computing node is associated with a communication link of the first virtual computer network that is configured to be associated solely with the specified virtual local area network, and wherein the modified communication forwarded over the substrate network does not include the identifier specific to the specified virtual local area network.

20. The non-transitory computer-readable medium of claim 16 wherein the stored contents include instructions that, when executed, further configure the computing system to, as part of modifying the communication before the communication is forwarded over the substrate network, remove the identifier specific to the specified virtual local area network from the communication if the communication includes the identifier specific to the specified virtual local area network.

21. A system comprising:
one or more hardware processors of one or more computing systems; and
one or more modules that are configured to, when executed by at least one of the one or more hardware processors, provide networking functionality for a first computer network that is overlaid on a substrate network and that has a specified virtual local area network logically interconnecting multiple computing nodes, the providing of the networking functionality including:
modifying a communication sent to a destination computing node of the multiple computing nodes from another of the multiple computing nodes, the modifying being performed before the communication is forwarded over the substrate network and including adding to the communication a substrate network identifier that is specific to the destination computing node;
forwarding, over the substrate network based on the added substrate network identifier, the modified communication to the destination computing node;
after the forwarding of the modified communication, further modifying the modified communication to include an identifier specific to the specified virtual local area network; and
initiating providing the further modified communication to the destination computing node.

22. The system of claim 21 wherein the one or more modules include software instructions that, when executed, further configure the one or more computing systems to receive from a user, before the providing of the networking functionality, configuration information that specifies a network topology for the first computer network including multiple router devices, and wherein the providing of the networking functionality is performed to provide the first computer network for the user in accordance with the configuration information and includes emulating functionality of the multiple router devices, the provided first computer network being a virtual computer network that includes multiple virtual local area networks.

23. The system of claim 21 wherein the destination computing node is associated with a communication link of the first computer network that is configured to not be associated solely with the specified virtual local area network, and wherein the modified communication forwarded over the substrate network does not include the identifier specific to the specified virtual local area network.

24. The system of claim 21 wherein the one or more modules include software instructions that, when executed, further configure the one or more computing systems to forward a second communication to a second computing node of the multiple computing nodes and to provide the forwarded second communication to the second computing node without modifying the second communication to include any information corresponding to the specified virtual local area network, wherein the second computing nod is associated with a communication link of the first computer network that is configured to be associated solely with the specified virtual local area network, and wherein the modified communication forwarded over the substrate network does not include the identifier specific to the specified virtual local area network.

25. The system of claim 21 wherein the one or more modules include software instructions that, when executed, further configure the one or more computing systems to identify that the communication is associated with the specified virtual local area network based at least in part on the destination computing node being associated with a communication link configured to be associated with the specified virtual local area network.

\* \* \* \* \*